United States Patent [19]

Ohno et al.

[11] Patent Number: 5,396,485
[45] Date of Patent: Mar. 7, 1995

[54] INFORMATION COMMUNICATION SYSTEM FOR POINT-TO-POINT COMMUNICATION AND POINT-TO-MULTIPOINT COMMUNICATION USING SAME LINES

[75] Inventors: Shuji Ohno, Kawasaki; Tetsuya Kawahara, Fujisawa; Keiichi Nakane, Yokohama; Masakazu Okada, Katsuta; Syoji Yamaguchi; Yoshimi Fujimata, both of Hitachi, all of Japan

[73] Assignees: Hitachi, Ltd., Tokyo; Hitachi Process Computer Engineering, Inc., Hitachi, both of Japan

[21] Appl. No.: 111,235

[22] Filed: Aug. 24, 1993

[30] Foreign Application Priority Data

Sep. 1, 1992 [JP] Japan ................................. 4-233336
Sep. 2, 1992 [JP] Japan ................................. 4-234474

[51] Int. Cl.⁶ ............................................ H04J 3/02
[52] U.S. Cl. ................................ 370/16; 370/85.1; 371/8.2
[58] Field of Search ................... 370/94.1, 16, 94.3, 370/60, 85.1; 371/8.1, 8.2, 9.1

[56] References Cited

U.S. PATENT DOCUMENTS

| | | | |
|---|---|---|---|
| 4,285,064 | 8/1981 | Hodge | 370/104.1 |
| 4,587,651 | 5/1986 | Nelson et al. | 370/68 |
| 4,750,109 | 6/1988 | Kita | 370/94.1 |

FOREIGN PATENT DOCUMENTS

63-61339 3/1988 Japan.
2143626 6/1990 Japan.

OTHER PUBLICATIONS

D-141—Distributed Multi-case Communication Processing (1992), T. Kawahara, S. Ohno, G. Anzai, S. Yamaguchi, Y. Fujimata, p. 6-141.
D-142—Guarantee of Data Integrity for High Reliable Communication System (1992), S. Ohno, T. Kawahara, G. Anzai, S. Yamaguchi, Y. Fujimata, p. 6-142.

*Primary Examiner*—Douglas W. Olms
*Assistant Examiner*—Min Jung
*Attorney, Agent, or Firm*—Kenyon & Kenyon

[57] ABSTRACT

In an information communication system for performing both point-to-point communication and point-to-multipoint communication between a host computer and terminals by using same lines while distributing loads of data communication, data communication report tables are provided on a main storage unit of the host computer for each type of communication. The data communication process is executed distributively at each CPU unit and communication interface unit of the host computer and at each control module of a communication control unit. A plurality of destination pattern tables indicating data destinations are provided for point-to-multipoint communication. For the point-to-multipoint communication, CPU unit designates a particular destination pattern table for each interface unit, and data transmission is requested to each control module in accordance with the destination pattern table.

18 Claims, 25 Drawing Sheets

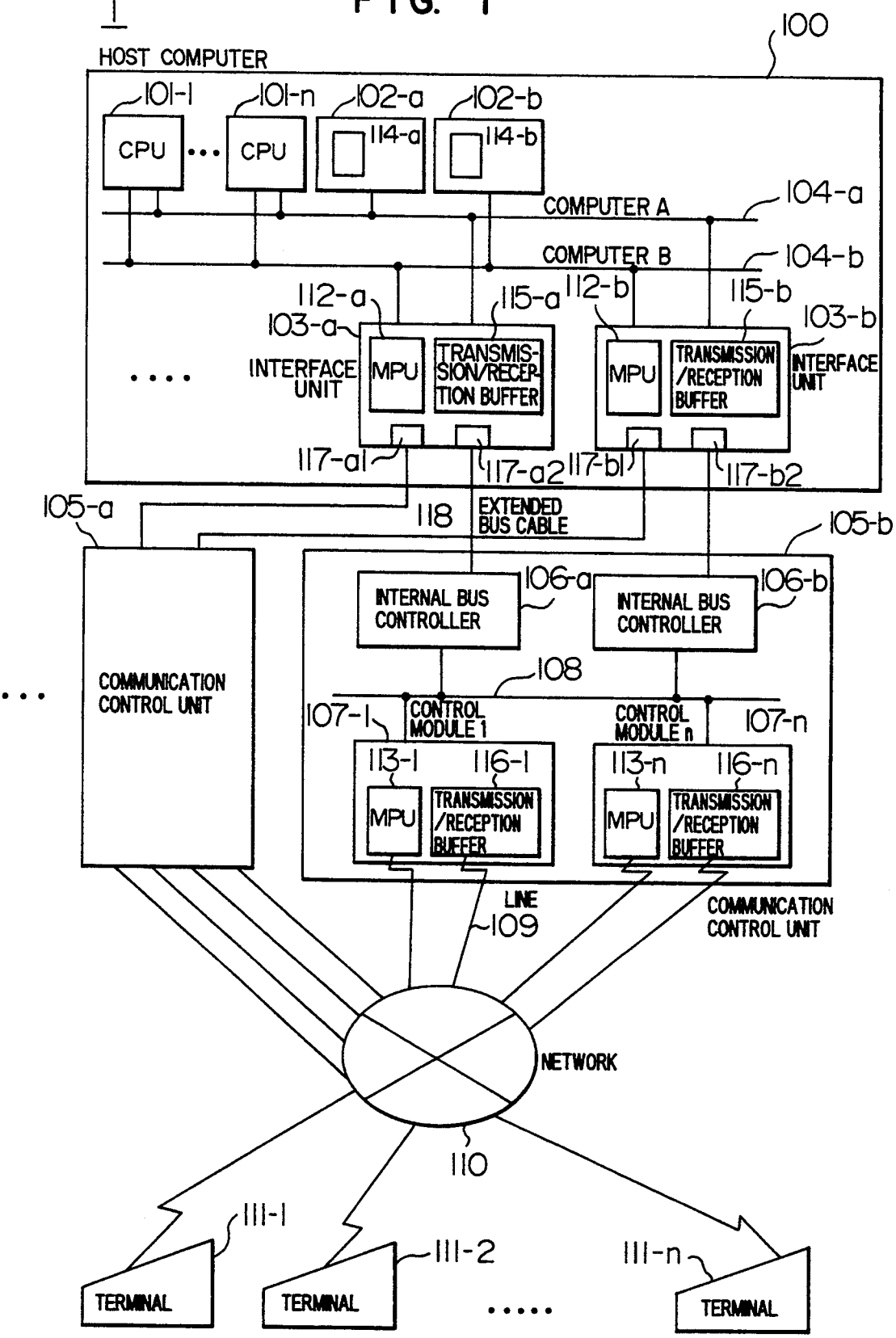

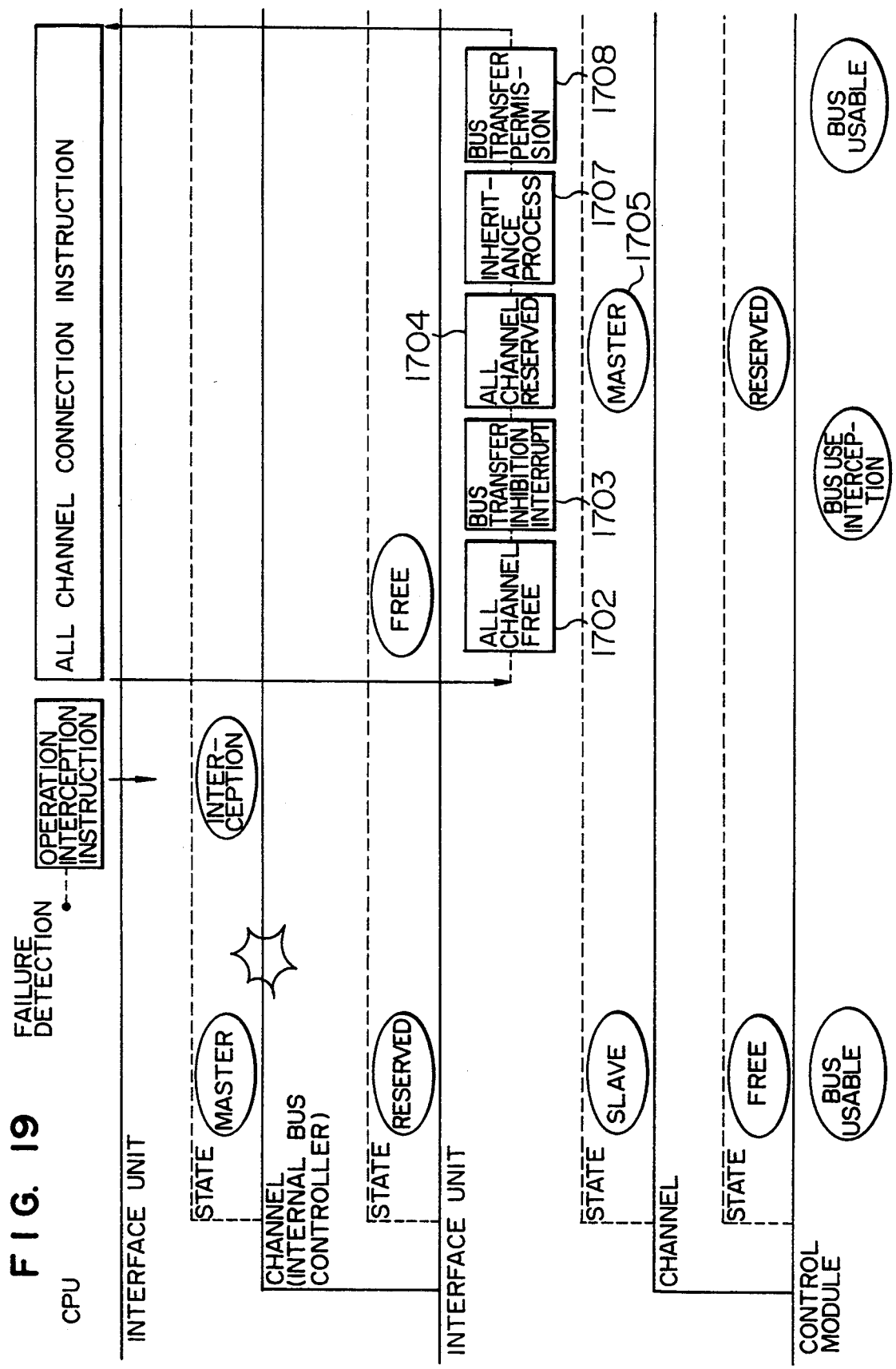

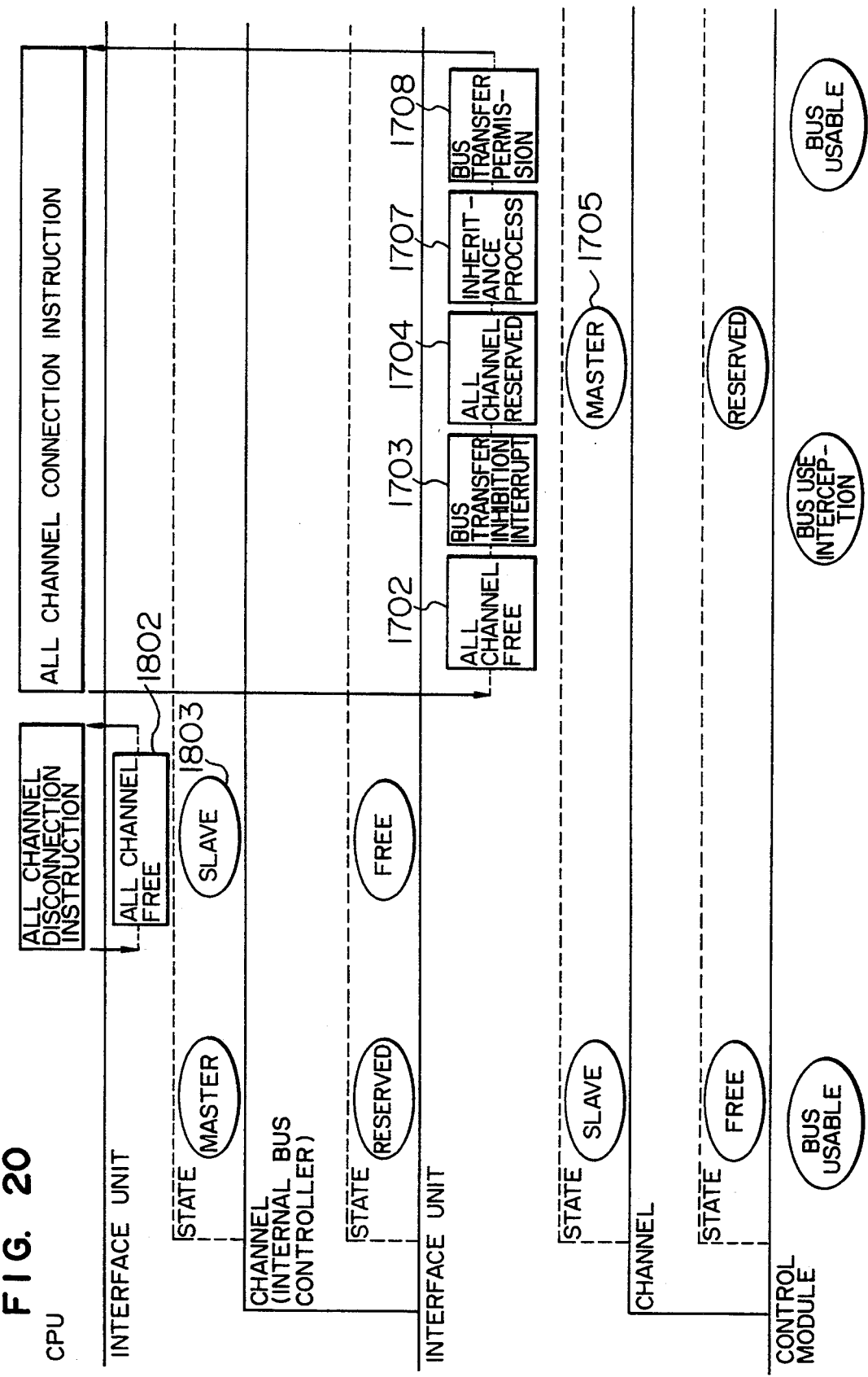

INFORMATION COMMUNICATION SYSTEM FOR POINT-TO-POINT COMMUNICATION AND POINT-TO-MULTIPOINT COMMUNICATION USING SAME LINES

BACKGROUND OF THE INVENTION

1. Field of the Invention

The present invention relates to an information communication system for data transmission/reception between a host computer and a plurality of terminals connected to the host computer via lines. More particularly, the present invention relates to an information communication system capable of performing both point-to-point and point-to-multipoint communications using same lines.

2. Description of the Related Art

There is known an information communication system which supports a point-to-point (PTP) communication for the transmission of data from a host computer to a particular terminal and a point-to-multipoint (PTMP) communication (inclusive of broadcast, and limited broadcast) for the transmission of same data from the host computer to a plurality of terminals, as disclosed for example in JP-A-2-14362G. With this information communication system, in transmitting data from a host computer to a particular terminal, the host computer instructs an interface unit to connect a line to the particularly terminal and thereafter sends the data from a data transmission/reception unit to the terminal via the connected line. In transmitting same data from the host computer to a plurality of terminals, the same procedure as the data transmission to a particular terminal is repeated as many times as the number of terminals. If lines including a particular line have been connected already, the data transmission/reception unit checks information added to the data so as to transmit it only to the particular terminal. In an alternative case, the host computer is connected to all the terminals via lines in advance so that the host computer can transmit data to desired terminals, by providing additional information to the data to be transmitted.

With this conventional technique, however, the host computer is required to be connected to a destination terminal each time data is to be transmitted, if it is not still connected to the line. There arises, therefore, the problem that data transmission is delayed by the time required for the interface unit to connect the line to the host computer. On the other hand, in the case where the line to a destination terminal has been connected already to the host computer (or if all lines are being connected to the host computer in advance), the amount of additional information representing destination terminals increases as the number of destination terminals increases (the additional information amount becomes great particularly when same data is transmitted to all the terminals), resulting in an increase of the amount of total information to be transmitted. An increase of the additional information increases the load to be processed by the host computer. There arises, therefore, the problem that a PTMP communication for transmitting same data to a plurality of terminals cannot be performed efficiently even if all lines are being connected to the host computer in advance.

For a conventional duplex communication system, there is known a technique of ensuring the integrity of communication data when the system is interchanged from an in-operation (master) system to a stand-by (slave) system, as described for example in JP-A-63-61339. According to this technique, the in-operation system is manually changed to the stand-by system after data to be inherited (received data, transmitted data, destination address waiting for data transmission, and the like) has been transferred from the in-operation system to the stand-by system. In this manner, the integrity of communication data has been retained. However, information to be inherited is not always possible to be transferred to the stand-by system from the in-operation system in trouble, posing a problem of disability of switching between duplexed systems. Also, although this conventional technique considers the integrity of communication data transmitted from the host computer to a terminal, it does not ensures the integrity of communication data transmitted from the terminal to the host: computer. There arises, therefore, the problem of missing communication data transmitted from a terminal when one system of the duplexed host computer becomes defective, although the host computer can still continue its operation.

As another conventional technique, there is known a system which provides various information services via communication lines, as presented by the paper, p-142, in The Institute of Electronics, Information, and Communication Engineers, 1992, Spring Meeting. In this system, the host computer has redundant internal elements to enhance the resistance against failure and ensure the data integrity when any redundant internal element becomes defective. To the memory space of this host computer ensuring a high operability because of redundancy, a communication data FIFO (First-in and First-out) queue and a status information storage area are assigned. The status information includes the status of reading data from the FIFO queue, and the status of writing data into a queue of a line control unit from which communication data is transmitted to a line. The status information is updated each time the communication process is executed. When the in-operation system of redundant elements on the data communication path becomes defective, the communication data is inherited in accordance with the status information, to avoid missing data and duplicated data. However, this conventional technique does not disclose how the host computer processes received data, although it describes how to transmit data from the host computer. This technique does not concern about the case of a plurality of destination terminals.

SUMMARY OF THE INVENTION

It is an object of the present invention to realize, in an information communication system, not only a point-to-point (PTP) communication for transmitting data to a desired terminal but also a point-to-multipoint (PTMP) communication capable of reducing the amount of information such as destinations necessary for a data communication request.

It is another object of the present invention to ensure the integrity of communication data when the in-operation system of the host computer of an information communication system fails and is switched to the stand-by system, without the host computer and terminals mutually confirming the data communication status before the failure.

It is a further object of the present invention to ensure the integrity of communication data when the in-operation system of the duplex system fails and is required to be switched, even in an information communication system providing both a PTP communication service for the transfer of data between a terminal and the host computer and a PTMP communication service for the transmission of same data from the host computer to a plurality of terminals.

It is a still further object of the present invention to detect a failure of the in-operation system of the duplex system and switch to the stand-by system in such a short time as not recognizable by a user of the information communication system.

BRIEF DESCRIPTION OF THE DRAWINGS

FIG. 1 is a schematic diagram showing the structure of an information communication system according to an embodiment of the present invention;

FIG. 19 is a diagram illustrating the duplex system switching procedure to be executed when the duplexed interface unit of the information communication system shown in FIG. 1 fails;

FIG. 20 is a diagram illustrating the system switching procedure to be executed when the maintenance for the duplexed interface unit of the information communication system shown in FIG. 1 becomes necessary;

DESCRIPTION OF THE PREFERRED EMBODIMENTS

Figure 2A:
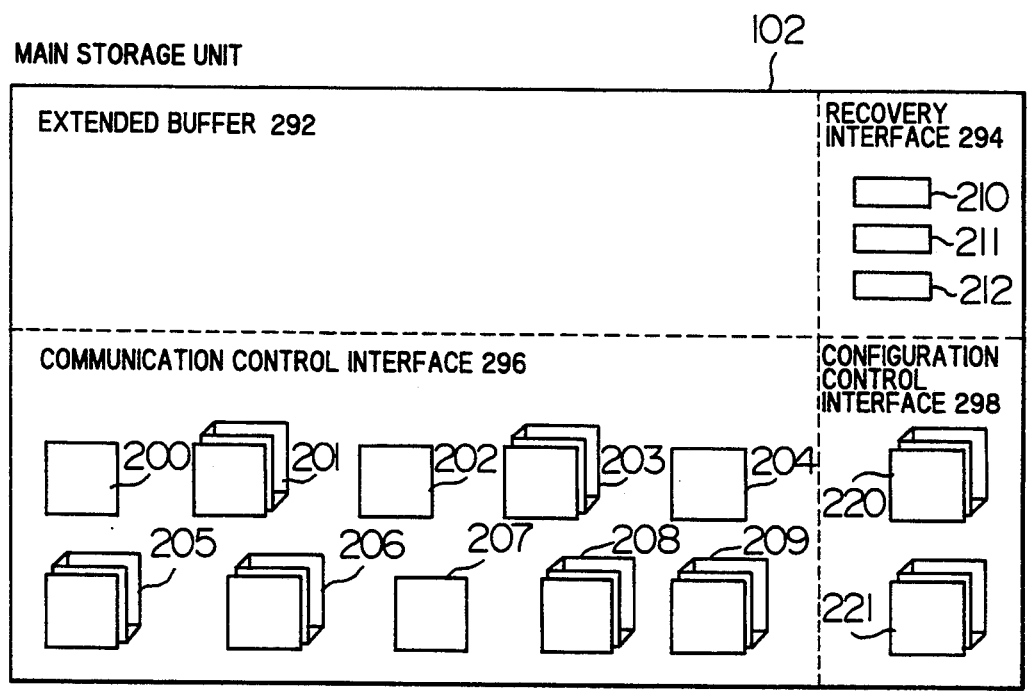
FIGS. 2A to 2C are diagrams showing the structures of communication processing interfaces of the main storage unit, interface unit, and control module, respectively of the information communication system shown in FIG. 1.

An information communication system of the present invention will be described in detail with reference to the accompanying drawings.

FIG. 1 shows the outline of an embodiment of a communication system 1 according to the present invention. The communication system 1 is constituted of a host unit and terminals 111-1 to 111-n. The host unit includes a host computer 100 and a multi-line communication control unit group 105 connected to the host computer 100. The terminals are connected via a network 110 to the host unit. Each communication control unit of the control unit group 105 accommodates and controls a plurality of lines 109. The host computer 100 includes a CPU block 101, a main storage block 102, an interface block 103, and a computer bus set 104. The internal structure of each block is duplexed or multiplexed to configure a fault tolerant computer capable of continuing its operation even if one of the systems becomes defective. The CPU block 101 includes a plurality of CPUs 101-i (i=1 to n), and the main storage block 102 includes main storage units 102a and 102b. Each interface unit pair 103-a, 103-b of the interface block 103 has a channel group 117 having a plurality of interface channel pairs 117-a1 and 117-a2, 117-b1 and 117-b2. Each interface unit 103-a, 103-b is connected to a corresponding communication controller pair 105-a, 105-b. In this way, the duplicate interconnection path between the host computer 100 and communication control unit group 105 is established.

Each communication control unit 105-i has two internal bus controllers 106-a and 106-b for controlling an internal bus 108 and a control module group 107. Each internal bus controller is connected to the host computer 100 via an extended bus cable 118. Each control module 107-i (i=1 to n) of the group 107 controls lines 109. Communications can thus be performed between a plurality of terminals 111-1 to 111-n and the host computer 100 via the network 110.

Figure 2B:
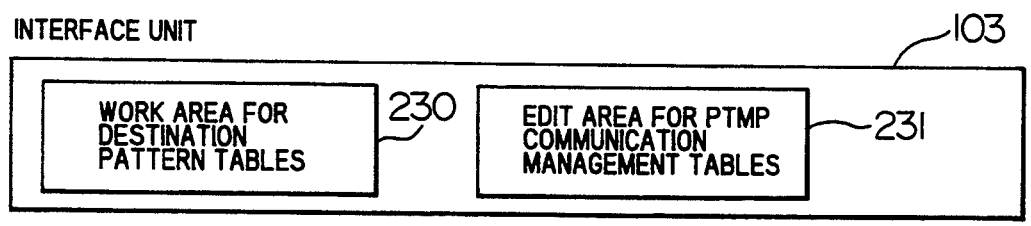
Figure 2C:
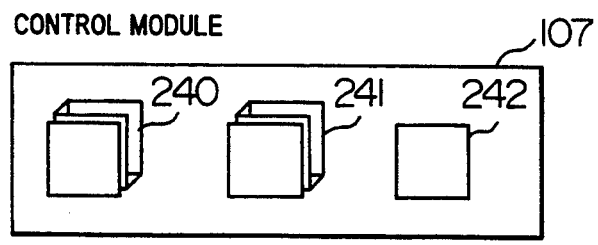

FIGS. 2A to 2C show the communication interface structure of the host unit of the information communication system according to an embodiment of the present invention. In the following description, a CPU 101-i is simply indicated as CPU 101, and other elements are also indicated in the like manner.

First, the interface between the CPU block 101 and communication interface block 103 of the host computer 100 will be described. The interface between the CPU block 101 and interface block 103 includes a communication control interface 296 and a configuration control interface 298. The communication control interface 296 is used for data communication such as point-to-point (PTP) Communication of data to one terminal 111 and point-to-multipoint (PTMP) communication of same data to a plurality of terminals 111-i (i=1 to n) at a time. The configuration control interface 298 is used for switching between an in-operation (master) system and a stand-by (slave) system of the interface block and for the configuration change of the communication control unit group. Queues or tables to be used by each interface unit are allocated on each main storage unit 102-a, 102-b of the main storage group 102. The communication control interface 296 has the following queues or tables: a request registered destination queue 200 for registering the destination of registration of a request for CPU 101 to be issued to an interface unit 103; PTP communication request queues 201 each for registering a PTP communication request for the data transmission via a single line 109; a PTMP communication request table 202 for registering a PTMP communication request for the transmission of the same data via a plurality of lines; PTP communication completion report queues 203 each for registering the information representative of the state of an execution completion for a PTP communication request by a control module 107; a PTMP communication completion report queue 204 for registering the information representative of the state of an execution completion for a PTMP communication request by an interface unit 103; reception report queues 205 each for registering the information representative of the received data from a terminal 111; communication interrupt report queues 206 each for registering the information representative of an occurrence of abnormality on a line 109; a report registered destination queue 207 for registering the information representative of a queue to be referred to by a CPU 101 when an interface unit 103 issues an interrupt to a CPU 101 upon the execution completion of a request or upon data reception; PTMP communication management tables 208 each being used by an interface unit 103 for managing the status of data transmission from the interface unit 103 to respective lines during the execution of the PTMP communication request; and PTMP communication request acceptance completion report queue 209 each for registering the information indicating the reception of a PTMP communication request in the queue 241 by a control module 107.

The queues 201, 203, 205, 206, and 209 are provided as many as the number of all lines covered by the communication control unit 105 connected to corresponding interface units 103, so that the order of transmission/reception at each line can be controlled. A plurality of management tables 208 are provided in order for each interface unit 103 to manage a plurality of PTMP communication procedures at a time. Each queue or table of the communication control interface 296 is shared by a pair of interface units 103 of the master and slave, and only the interface unit in the in-operation system is allowed to access it.

In cooperation with the communication control interface 296, the following two work areas are provided in each interface unit 103, namely, a destination pattern table work area 230 and a communication management table edit area 231, The work area 230 is used for storing a destination pattern table for registering the destinations of data for a PTMP communication request issued from a CPU 101 to an interface unit 103. The table edit area 231 is used for editing the PTMP communication management table 208 by using the destination pattern table stored in the work area 230. The edit area 231 is partitioned into as many sub-areas as the number of management tables 208. The management table in the edit area 231 is mainly used for the PTMP communication request process by the interface unit 103, such as searching transmission destinations and generating a transmission completion report to a CPU 101, whereas the management table 208 of the communication control interface 296 is mainly used for recording the history of the PTMP communication request process.

The configuration control interface 298 includes request message tables 220 and completion message tables 221. The request message table 220 is used for reporting a request message such as a system switching message issued from a CPU 101 to an interface unit 103. The completion message table 221 is used for reporting a completion message such as a completion report, indicating the execution completion of a request message, from an interface unit 103 to a CPU 101. The request message/completion message is assigned a plurality of priority levels. A plurality of tables 220 and 221 are therefore prepared for each priority level so as to permit the priority process for a particular request message. Each table of the configuration control interface 298 is independent from the master/slave interface units 103.

Next, the interface between the communication interface block 103 and control module group 107 will be described. The interface between the interface unit 103 and control module 107 includes: PTP communication command queues 240 each for registering a PTP communication command when an interface unit 103 receives a PTP communication request from a CPU 101; PTMP communication command queues 241 each for registering a PTMP communication command from an interface unit 103 in a corresponding control module 107 when the interface unit 103 receives a PTMP communication request from a CPU 101; and an interrupt notice table 242 used for indicating for which of reports an interrupt was issued from the control module 107 to the interface unit 103; the reports including a report of a data transmission process completion in response to a PTP communication request, a report of an acceptance completion of a PTMP communication command, a report of a reception from a terminal, and a report of occurrence of abnormality on a line. In order to increase the number of PTMP communication commands registerable in the queue 241, the main storage unit 102 is provided with an extended buffer 292.

Lastly, a recovery interface 294 will be described. This interface 294 transfers inheritance information between master and slave interface units 103 when they are interchanged. The recovery interface 294 includes: a table 210 for storing a current write pointer to a command presently registered in the queue 240 or 241 of each control module 107; a table 211 for storing, when an interface unit 103 receives a communication request from a CPU 101 via the queue 200, a next read pointer to a command to be received from the queue 201 of each line at the next request acceptance; and a storage area 212 for storing a destination pattern table.

Figure 3A:
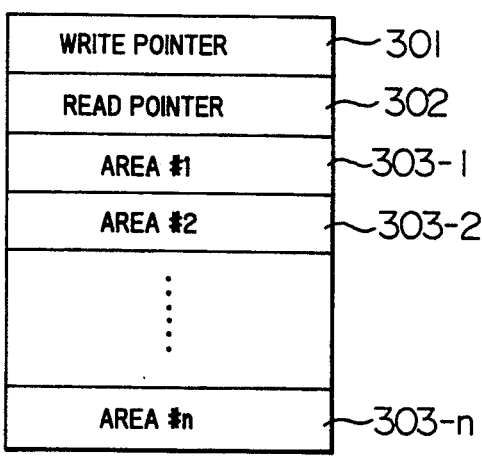
FIGS. 3A to 3E are diagrams showing the structures of the queues 200, 207; 201, 203 to 206, 209, 240; 202, 241; 242 shown in FIGS. 2A to 2C.

Next, the structure of queues and tables constituting the above-described interfaces will be described with reference to FIGS. 3A to 3E, FIGS. 4A and 4B, and FIGS. 6A and 6B. FIG. 3A shows the structure of the request registered destination queue 200 and interrupt report registered destination queue 207. In FIG. 3A, a field 301 stores a write pointer to the location (serial number) of an area 303 in which information can be registered in a queue. A field 302 stores a read pointer to the location (serial number) of an area 303 in which information was registered. The number n of areas 303 corresponds to the total number of data transmission requests allowing an interface unit 103 to transmit data n times to each line 109 covered by the communication control unit 105 connected to the interface unit 103.

Figure 3B:
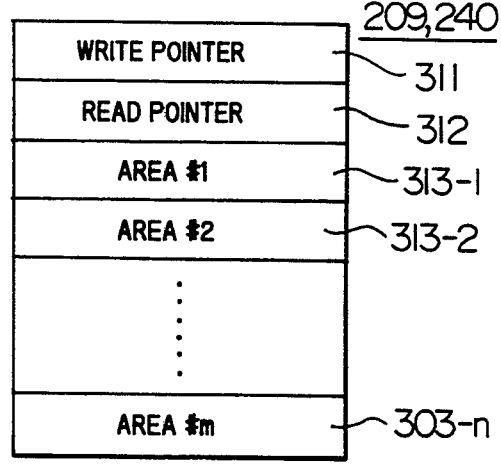

FIG. 3B shows the structure of the PTP communication request queue 201, completion report queues 203 and 204, reception report queue 205, communication interrupt report queue 206, PTMP communication request reception completion report queue 209, and PTP communication command queue 240. In FIG. 3B, a field 311 stores a write pointer to the location (serial number) of an area 313 in which information is registered. A field 312 stores a read pointer to the location (serial number) of an area 313 in which information was registered. The number m of areas 313 corresponds to the total number of reception/transmission data buffers in the control module 107 provided for each line 109.

Figure 3C:
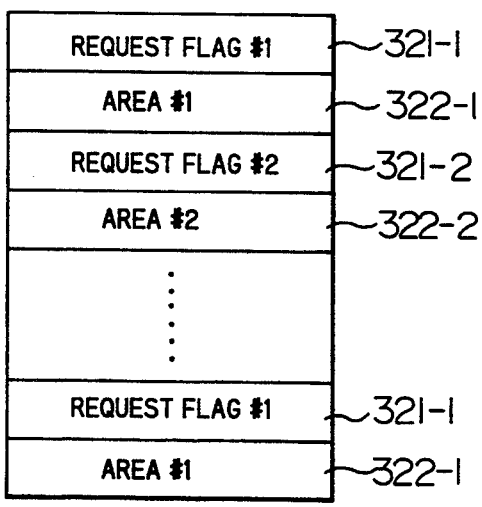

FIG. 3C shows the structure of the PTMP communication request table 202. In FIG. 3C, a field 321 stores a request flag indicating whether valid request information is being stored in an area 322. The number l of areas 322 corresponds to the number of management tables, i.e., the number of PTMP communications capable of being processed by the interface unit 103 at a time. Each area 322 is in one-to-one correspondence with each of the management tables 208.

Figure 3D:
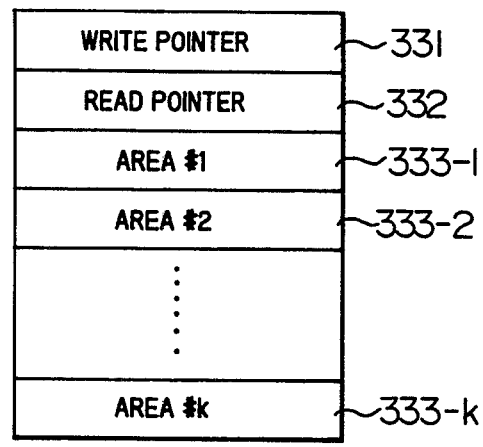

FIG. 3D shows the structure of the PTMP communication command queue 241. In FIG. 3D, a field 321 stores a write pointer to the location (serial number) of an area 333 in which information is stored. A field 332 stores a read pointer to the location (serial number) of the area in which information was registered. The number k of areas 333 corresponds to the number of PTMP communication commands receivable from the interface unit 103 in several seconds even if the quality of the line 109 deteriorates and the throughput of data transmission is temporarily lowered.

Figure 3E:
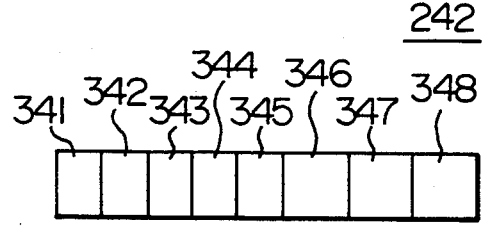

FIG. 3E shows the structure of the interrupt notice table 242. In FIG. 3E, a field stores an interrupt flag indicating whether valid interrupt information is being set in the table 242. Fields 342 to 345 store flags indicating the type of interrupt notice. The field 342 stores a flag indicating a completion report of a communication command process, the field 343 stores a flag indicating a communication interrupt report for reporting the occurrence of the line abnormality or the like, the field 344 stores a flag indicating a data reception report from a terminal, and the field 345 stores a flag indicating a reception completion report of a PTMP communication command. Fields 346 to 348 store sources from which interrupt notices were issued. The field 346 stores the serial number of the control module of the communication control unit 105, the field 347 stores the serial number of a line connected to the control module 107, and the field 348 stores the serial number of a terminal connected to a line 109.

Each queue (200, 201, 203 to 207, 209, 240, and 241) is controlled by a first-in-first-out (FIFO) scheme. The write and read pointers of each queue are controlled as in the following. In updating the write pointer 301 (or 311, 331) and read pointer 302 (or 312, 332), the first area 303-1 (or 313-1, 333-1) is pointed after the n-th (or m-th, k-th) area 303-n (or 313-m, 333-k). In updating the write pointer 301 (or 311, 331), it is updated so as not to point any area subsequent to the area 303 (or 313, 333) pointed by the read pointer 302 (or 312, 332). In updating the read pointer 302 (or 312, 332), it is updated so as not to point any area preceding to the area 303 (or 313, 333) pointed by the write pointer 301 (or 311, 331).

Figure 4A:
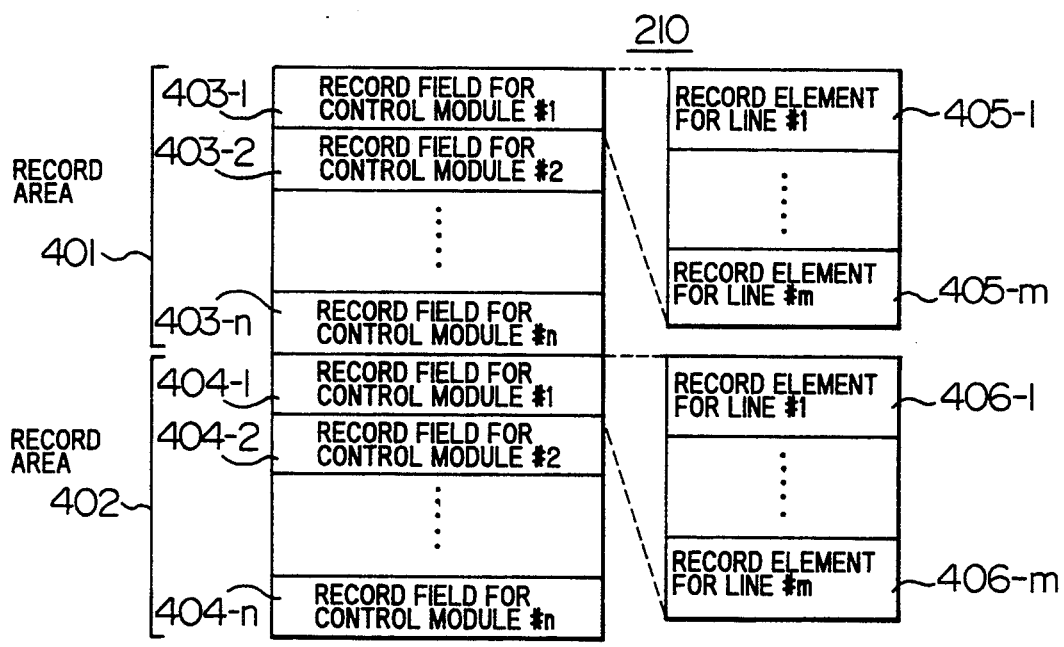
FIGS. 4A and 4B are diagrams showing the structures of the queues 210 and 211 of the recovery interface shown in FIG. 2A.

FIG. 4A shows the structure of the current write pointer table 210. In FIG. 4A, a recording area 401 stores a write pointers 311 of the PTP communication command queue 240 of each control module 107, and a recording area 402 stores a write pointers 331 of the PTMP communication command queue 241 of each control module 107. Each record area is constructed of record fields 403-1 to 403-n, 404-1 to 404-n for all the control modules 107 of the communication control unit 105 connected to the interface unit 103. Each record field 403 (404) is constructed of record elements 405-1 to 405-m, 406-1 to 406-m for respective lines 109 connected to the control module 107. Therefore, the write pointer (311, 331) of each command queue (240, 241) is written in the corresponding record element (405, 406).

Figure 4B:
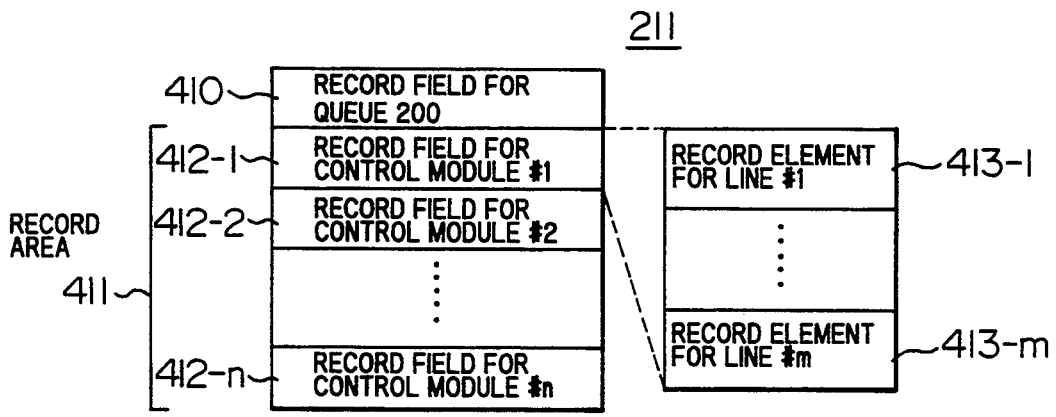

FIG. 4B shows the structure of the next read pointer table 211. In FIG. 4B, a recording field 410 stores a write pointer 301 of the request registered destination queue 200, and a recording area 411 stores a write pointer 311 of each PTP communication request queue 201. The record area 411 is constructed of record fields 412-1 to 412-n for all the control modules 107 of the communication control unit 105 connected to the interface unit 103. Each record field 412 is constructed of record elements 413-1 to 413-m for recording write pointers 311 of the PTP communication request queues 201 for respective lines 109 connected to the control module 107.

Figures 5A, 5B:
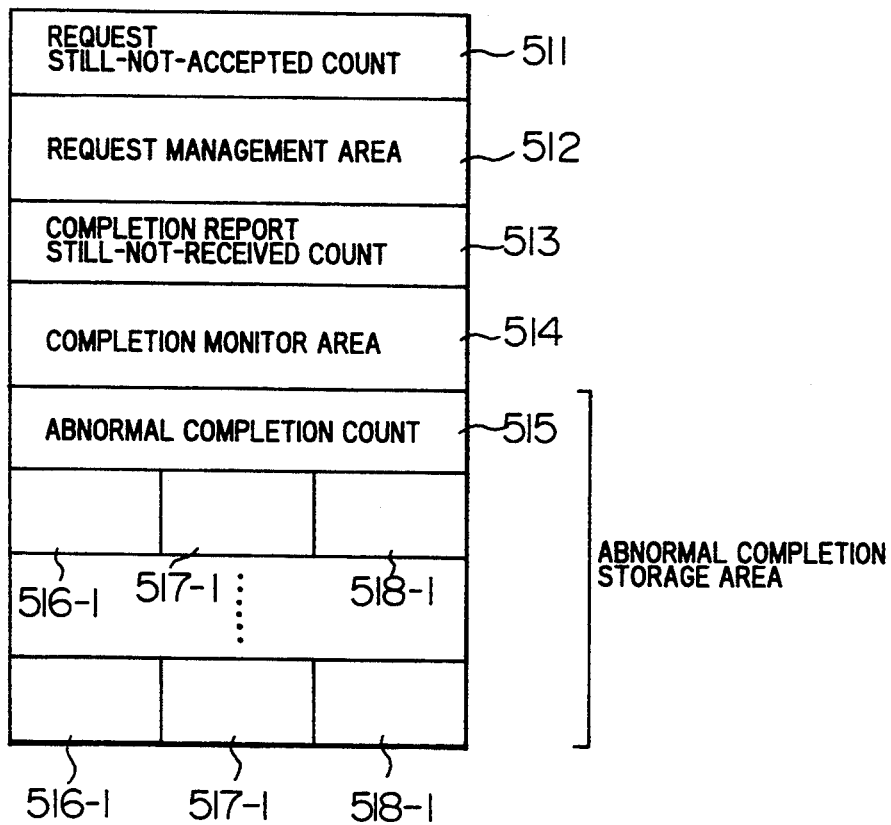
FIGS. 5A and 5B are diagrams showing the structures of the tables 500 and 208 to be used for PTMP communication processing.

FIG. 5A shows the structure of the destination pattern table 500 which is referred to when the interface unit 103 instructs the control module 107 to perform PTMP data transmission. In FIG. 5A, reference numeral 501 represents the serial numbers assigned to all the control modules 107 of the communication control units 105 connected to the interface units 103. Reference numeral 502 represents the serial numbers assigned to the lines 109 covered by each control module 107. The pattern table 500 stores the value "1" or "0" representing in unit of line whether data transmission in the PTMP communication is necessary or not, the values being set for each line serial number 502 of each serial number 501 of a control module. A plurality of pattern tables 500 are prepared so as to allow any combination of a plurality of lines to destinations in accordance with the contents of PTMP communication data.

FIG. 5B shows the structure of the PTMP communication management table 208. In FIG. 5B, a field 511 stores the total number of lines 109 that the PTMP communication command is not still registered in the control module 107, among those lines to which data is transmitted during the PTMP communication process. An area 512 represents a request management area used for indicating whether data transmission is necessary or not during the PTMP communication, this area being set for all the lines 109 covered by all the communication control units 105 connected to the interface units. The structure of this area is the same as that of the pattern table 500. A field 513 stores the total number of control modules (as counted in unit of lines) still not returning the acceptance process completion report in response to the PTMP communication request from the interface unit 103, among those lines whose control module 107 has registered the PTMP communication command during the PTMP communication. An area 514 represents a completion monitor area for storing the information that the interface unit 103 has received the acceptance process completion report from the control module 107 in response to the PTMP communication request. A field 515 represents the total number of control modules (as counted in unit of lines) which failed the acceptance of the PTMP communication request because of some abnormality or did not returned the acceptance process completion report in response to the PTMP communication request. Fields 516-1 to 516-l, 517-1 to 517-l, and 518-1 to 518-l store the serial numbers of abnormally terminated control module and line and the type of abnormality. These fields store such information in the order of abnormality occurrence.

Figure 6A:
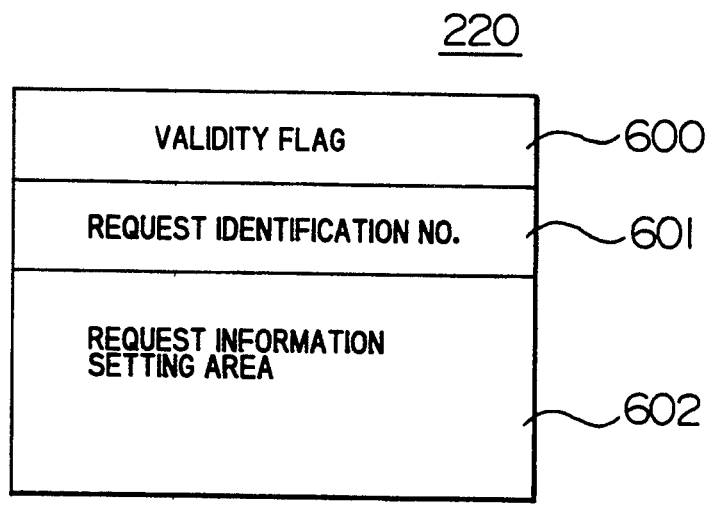
FIGS. 6A and 6B are diagrams showing the structures of the tables 220 and 221 of the configuration control interface shown in FIG. 2A.

FIG. 6A shows the structure of the request message table 220. In FIG. 6A, a field 600 stores a validity flag indicating whether request information is set in the message table, a field 601 stores an identification number indicating the priority level of the message table 220, and an area 602 is used for setting request information.

Figure 6B:
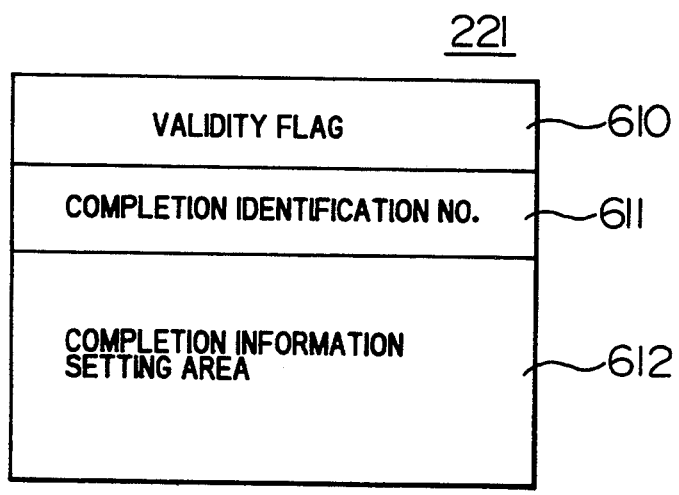

FIG. 6B shows the structure of the completion message table 221. In FIG. 6B, a field 610 stores a validity flag indicating whether completion information is set in the message table 221, a field 611 stores an identification number indicating the priority level of the message table 221, and an area 612 is used for setting completion information.

Next, the operation of the information communication system of the present invention will be described briefly. In the following description, CPU 101-i is simply indicated as CPU 101, and other elements are also indicated in this way.

The communication process by the communication system 1 is distributively executed by the CPU block 101 of the host computer 100, MPU group 112 of the interface block 103, and MPU group 113 of the control modules 107. Communication data during the communication process is transferred among the transmission/reception buffer 114 of the main storage unit 102, the transmission/reception buffer 115 of the interface unit 103, and the transmission/reception buffer 116 of the control module 107. In transferring communication data (received data or the like) from the control module 107 to the main storage unit 102 via the interface unit 103, the interface unit 103 transfers the same data to both the transmission/reception buffers 114-a and 114-b of the main storage units 102-a and 102-b via the duplexed computer busses 104. In receiving communication data (transmitted data or the like) from the buffer 114 of the main storage unit 102 to the interface unit 103, the interface unit 103 checks and receives the same data both from the buffers of the main storage units 102-a and 102-b via the busses 104. The contents of the communication process at each element will be described later. Each interface unit of the block 103 is managed by CPU 101 either as an in-operation system or as a stand-by system, in accordance with the state of the interface channels 117. A master state means that the interface unit 103 has at least one or more reserved interface channels 117, and a slave state means that the interface unit 103 has no reserved channel 117. The state of the channel 117 enters a reserved state when the internal bus controller 106 is logically connected to the internal bus 108, and enters a free state when it is logically disconnected from the internal bus 108. The logical connection of two internal bus controllers 106 of each communication control unit 105 is controlled exclusively so as both the controllers not to enter the reserved state at the same time.

Next, referring to FIGS. 7A and 7B, and 8A and 8B, the procedure of the request/completion process by the configuration control interface 298 and communication control interface 296 will be described. First, the request process by the configuration control interface will be described with reference to FIG. 7A. For the control of the interface unit 103 such as system switching, CPU 101: (1) sets request information such as a configuration control command to the request message table 220 of the main storage unit 102, and (2) issues an interrupt to the interface unit 103 via the computer bus 104 to inform the interface unit 103 of the request information. The interface unit 103 received the interrupt from CPU 101: (3) fetches the request information from the message table 220, and (4) issues an interrupt to CPU 101 to inform it of a request information reception completion.

Figure 7A:
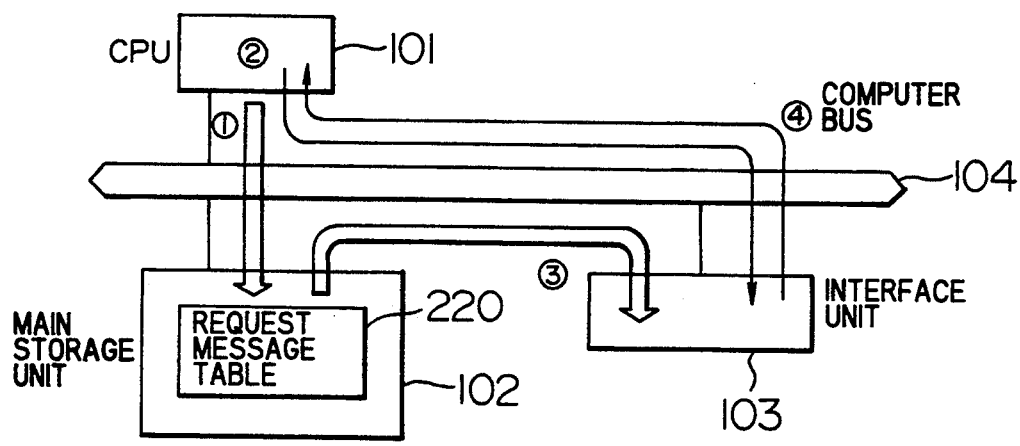
FIGS. 7A and 7B are schematic diagrams illustrating the procedure of request and completion processes to be executed by the configuration control interface shown in FIG. 2A.
Figure 7B:
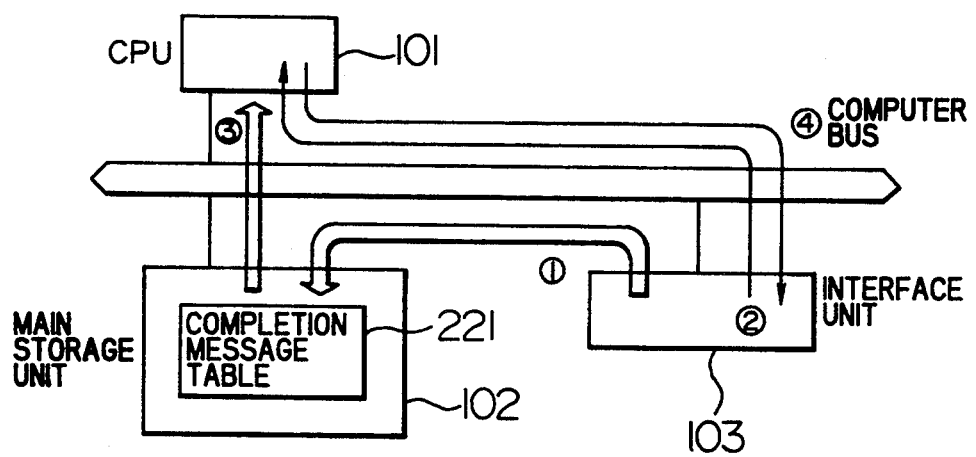

FIG. 7B illustrates the procedure of the completion process by the configuration control interface. The interface unit 103 which completed the execution of the request information received during the request process, reports the completion of the process to CPU 101 as in the following. The interface unit 103: (1) sets completion report information to the completion message table 221 of the main storage unit 102, and (2) issues an interrupt to CPU 101 to report the completion of the process to CPU 101. CPU 101 received the interrupt from the interface unit 103: (3) fetches the completion information of the completion message table 221, and (4) issues an interrupt to the interface unit 103 to inform the interface unit 103 of the completion of the reception of the completion report.

Figure 8A:
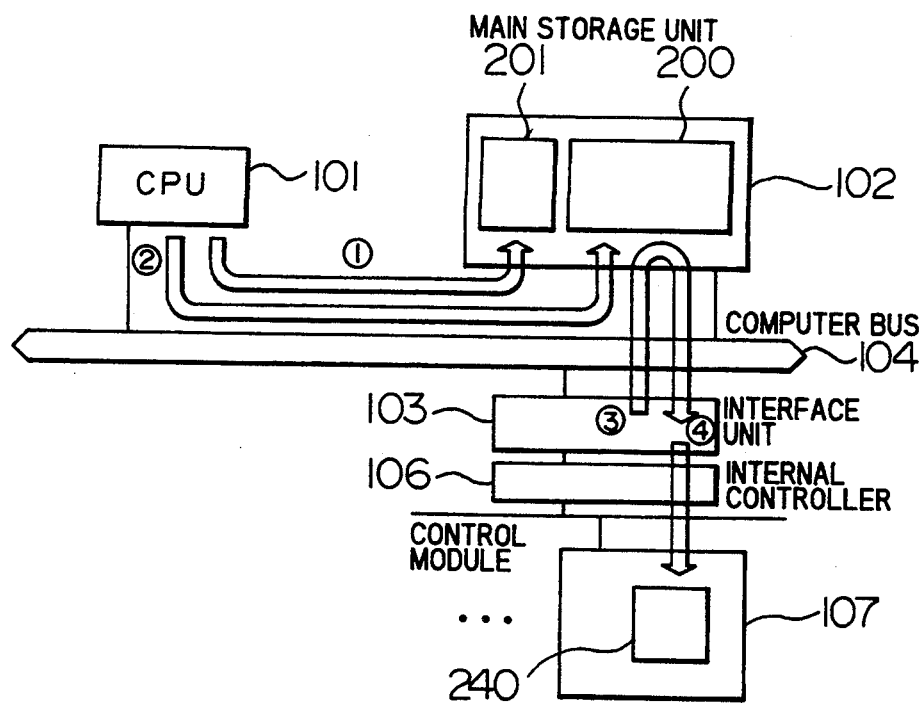
FIGS. 8A and 8B are schematic diagrams illustrating the procedure of request and completion processes for PTP communication to be executed by the communication control interface shown in FIG. 2A.
Figure 8B:
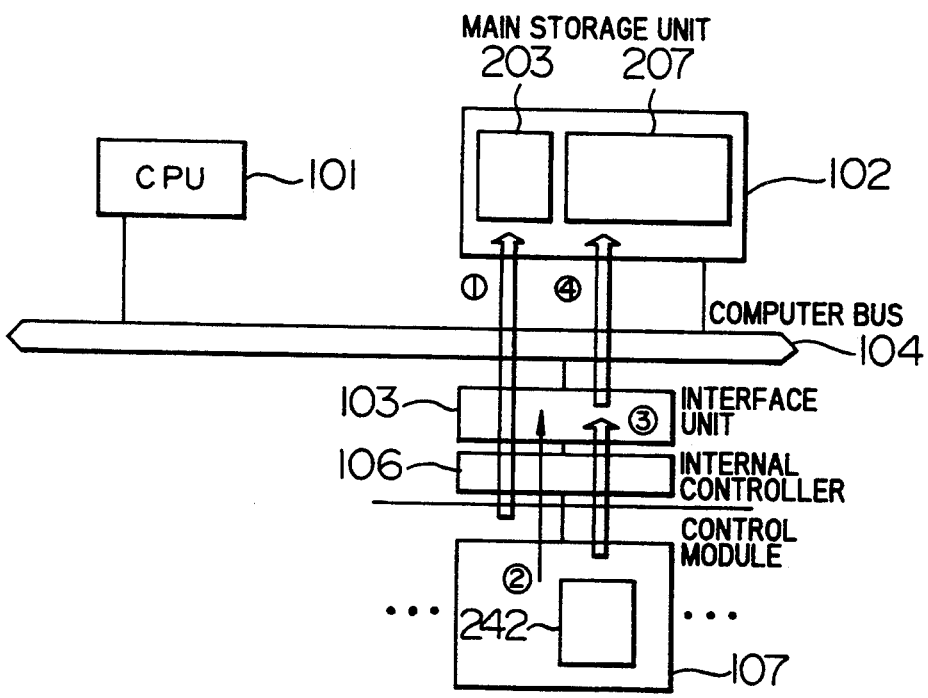

FIGS. 8A and 8B show the outline of the PTP communication request/completion process contained in the communication process to be executed by the communication control interface and the interface between the communication control unit and control module.

FIG. 8A shows the procedure of the PTP communication request process by the two interfaces. In requesting for data transmission to a desired single line 109 via the control module 107, CPU 101: (1) registers a PTP communication request in the PTP communication request queue 201 of the main storage unit 102 corresponding to the desired line 109. Next, CPU 101: (2) issues the communication request by registering the information for identifying the queue 201 in the request registered destination queue 200 of the main storage unit 102. The interface unit 103: (3) periodically monitors the information registered by CPU 101 in the request registered destination queue 200, and when the registered information is detected, (4) registers a PTP communication command in the queue 240 of the control module 107. The PTP communication command contains the communication type representing whether communication is a PTP communication or a PTMP communication, and the storage address and size of transmission data. The PTMP communication command contains, in addition to the communication type and the storage address and size of transmission data, the serial number of the destination pattern table 500 used by the PTMP communication.

FIG. 8B shows the procedure of the PTP communication completion process by the two interfaces. After completing the PTP communication, the control module 107: (1) registers the completion information in the PTP communication completion report queue 203 of the main storage unit 102, and (2) sets interrupt information in the interrupt notice table 242 to issue an interrupt to the interface unit 103. On receiving the interrupt from the control module 107, the interface unit 103: (3) fetches the interrupt information from the table 242, and (4) registers the interrupt information in the report registered destination queue 207 of the main storage unit 102 to issue an interrupt to CPU 101.

The detailed procedure of the data communication by the in-operation interface unit will be described with reference to FIGS. 9 to 13.

Figure 9:
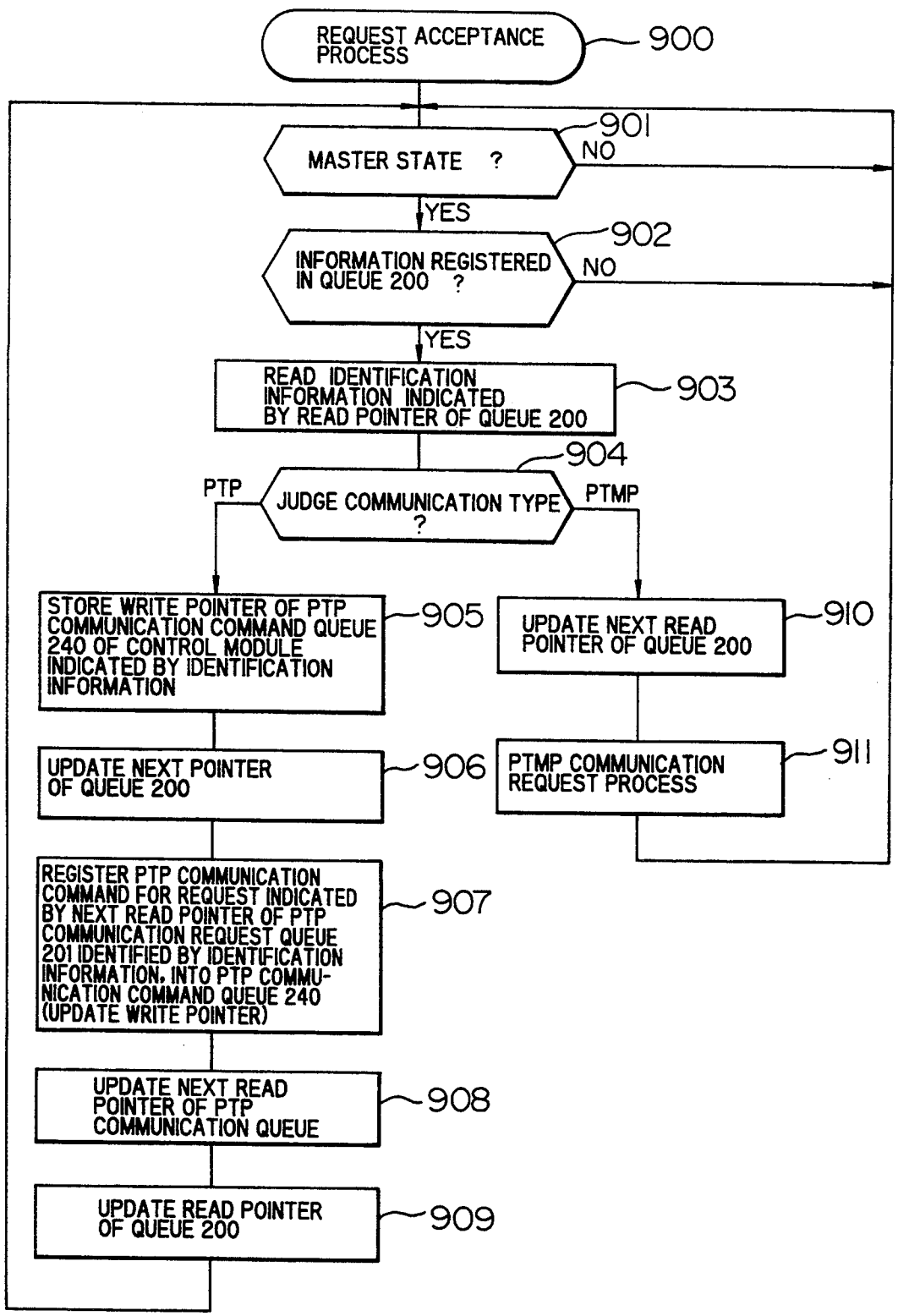
FIG. 9 is a flow chart illustrating the request acceptance process by the interface unit of the information communication system shown in FIG. 1.

First, with reference to FIGS. 9, 10 and 11, there will be described a request acceptance process/PTP communication request process, and an interrupt reception process/interrupt report process. In a request acceptance process 900, the interface unit 103 judges whether it is in the master state or in the slave state (Step 901). If in the slave state, this judgement of Step 901 is repeated. If in the master state at the judgement of Step 901, it is checked, from a difference between the values of the write pointer 301 and read pointer 302 in the request registered destination queue 200 of the communication interface 296, whether there is any registered information (Step 902). If there is no registered information (if the difference is zero), the master/slave state is again checked. If it is judged at Step 902 that there is registered information (that the difference is not zero), the identification information is read from the queue 200 at the area 303 pointed by the read pointer 302 (Step 904). If it is judged from the judgement result at Step 904 that the communication is the PTP communication, the value of the current write pointer 311 of the PTP communication command queue 240 of the control module 107 corresponding to the PTP communication queue 201 identified by the identification information is registered in the corresponding line record element 405 of the control module record field 403 in the PTP communication record area 401 which is contained in the current write pointer table 210 of the recovery interface 294 of the main storage unit 102 (Step 905). Next, the value of the updated read pointer 302 of the request registered destination queue 200, i.e., the next read pointer value, is recorded in the queue 200 field 410 of the next read pointer table 211 of the recovery interface 294, to thereby update the next read pointer of the queue 200 to designate the area 303 to be next read (Step 906). Next, the information registered in response to the PTP communication request in the area 313 pointed by the read pointer 312 in the PTP communication request queue 201 is written in the information registration area 313 indicated by the write-pointer 311 to update the information in the area 313 (Steep 907). The next read pointer of the PTP communication request queue 201 is updated in the next read pointer table 211 (Step 909), the read pointer 302 of the request registered destination queue 200 is updated (Step 909), and the identification information is discarded to complete the request process at the interface unit 103 relative to the data communication request from CPU 101.

The next read pointer indicates up to which area in the queue 200 the registered information was read by the interface unit 103, and updating this pointer does not mean the operation of fetching the registered information from the queue 201. The next read pointer is initialized to zero at the system initialization, like the read pointer and write pointer.

If the judgement result at Step 904 indicates the PTMP communication, the next read pointer of the request registered destination queue 200 is updated (Step 910) to switch to a PTMP communication request process 911 and thereafter the master/slave state is again checked.

In this manner, the in-operation interface unit performs the request process in response to the data communication request from CPU via the communication control interface, only when the interface unit is in the master state.

Figure 10A:
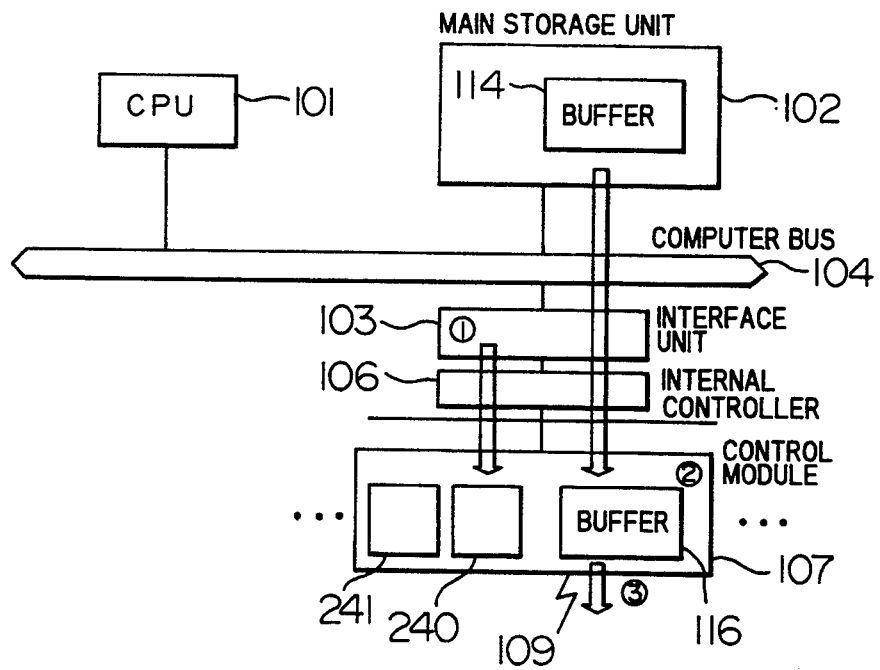
FIGS. 10A and 10B are schematic diagrams illustrating the procedure of a data communication process by the control module shown in the figure of the information communication system.

FIG. 10A shows the procedure of the PTP communication request process by the control module 107. The control module 107 periodically monitors the command registered by the interface unit 103. As described with FIG. 9, if the control module 107: (1) detects the PTP communication command registered in the PTP communication command queue 240, the control module 107: (2) transfers, in accordance with the contents of the detected command, the transmission data from the transmission/reception buffer 114 to the buffer 116, and thereafter (3) transmits the data to the single line 109.

In the PTMP communication request process, the transmission data is set in the transmission/reception buffer 115 by the interface unit 103. The control module 107 reads the transmission data from the buffer 115 and transfers it to the buffer 116. After the data transfer, the request acceptance completion is reported to the interface unit 103. When an acknowledgement of data transmission is received from the line 109 after the transmission data has been sent to the line 109, the control module 107 updates the read pointer 312 or 332 of the command queue 240 to discard the command. If the received acknowledgement is for the PTP data transmission, a communication completion is reported to the interface unit 103.

The control module 107 has the PTMP communication command queue 241 as well as the command queue 240. By changing the period of the periodical monitoring of each command queue, it is possible to change the priority level of data communication relative to the terminal 111.

Figure 10B:
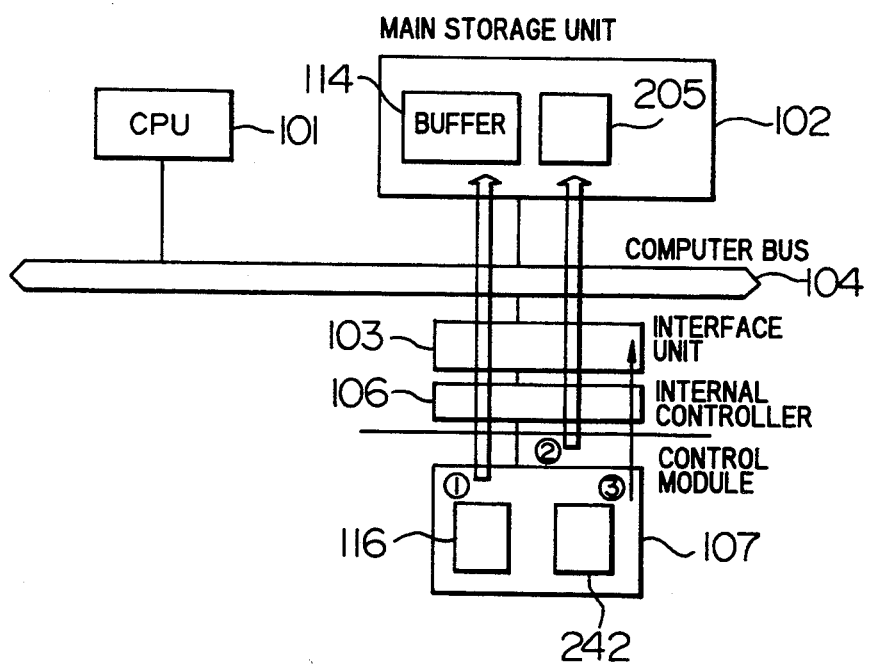

FIG. 10B shows the procedure of the process of receiving data from a terminal 111 to be executed by the control module 107. In reporting a data reception from a terminal to the interface unit 103, the control module 107: (1) transfers received data from the buffer 116 to the buffer 114, (2) registers a reception report in the reception report queue 205 of the communication control interface 296, and (3) sets information to the notice table 242 to issue an interrupt to the interface unit 103.

Figure 11:
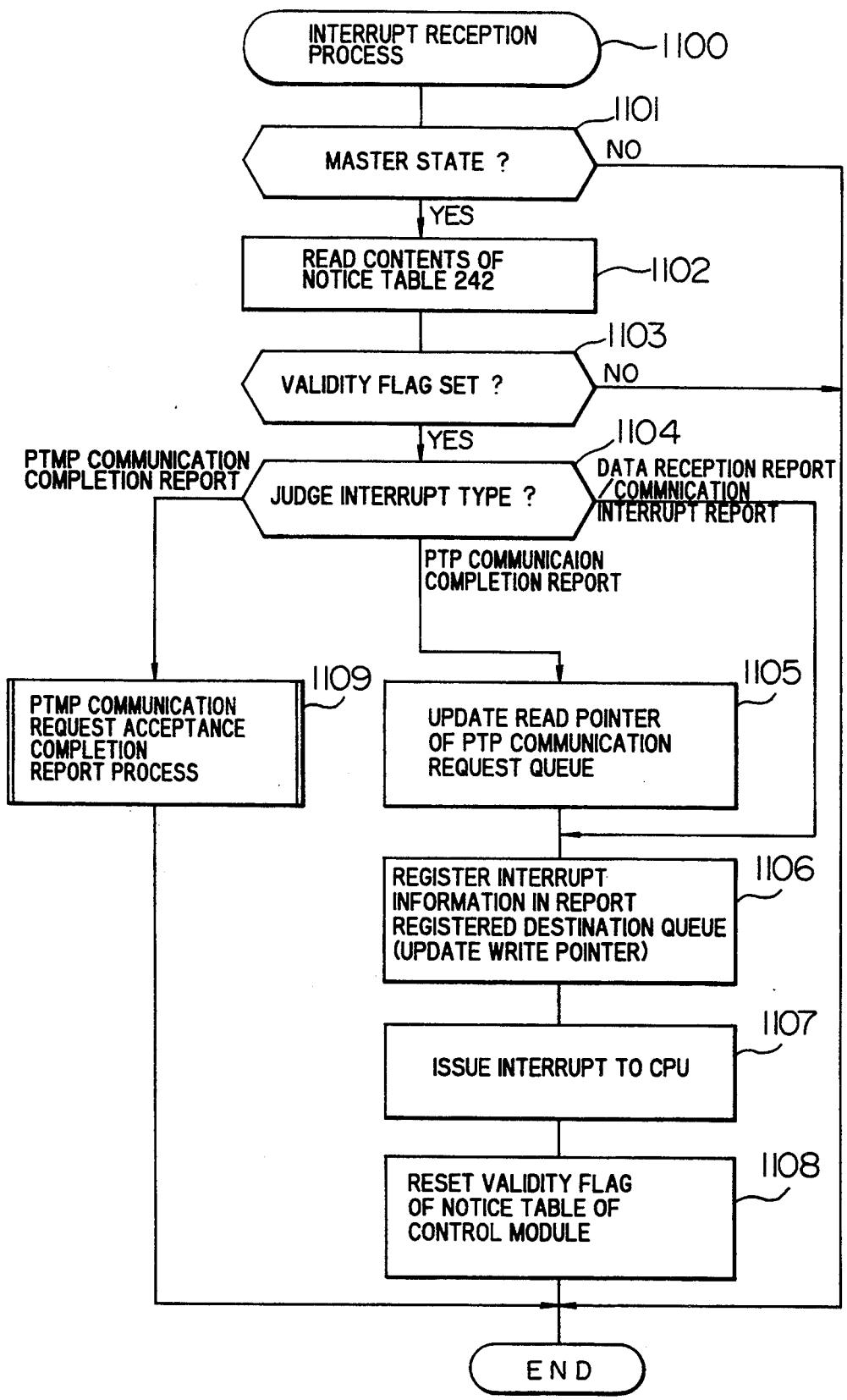
FIG. 11 is a flow chart illustrating the interrupt reception process and the interrupt report process by the interface unit of the information communication system shown in FIG. 1.

FIG. 11 shows an interrupt reception process and interrupt report process by the in-operation interface unit which received an interrupt from the control module 107.

In the interrupt reception process 1100, upon receiving an interrupt from the control module 107, the interface unit 103 judges whether the state is the master state or slave state (Step 1101). If in the slave state, the process is terminated. If the judgement result at Step 1101 indicates the master state, the interface unit 103 reads the interrupt information in the notice table 242 (Step 1102) to check whether the validity flag 341 of the notice table 242 is being set or not (Step 1103). If the judgement result at Step 1102 indicates that the validity flag 341 is not being set, the process is terminated. If the validity flag 341 is set, the type of the interrupt information is checked (Step 1104). If the validity flag 241 is set, if the PTP communication completion flag 342 is set, and if the interrupt information indicates that the interrupt has been issued because of the completion of the request from the host computer 100, then the read pointer 312 of the PTP communication queue 201 corresponding to the interrupt information is updated (Step 1105) and the PTP communication command is discarded. The interrupt information is registered in the report registered destination queue 207 of the main storage unit 102 (Step 1106), an interrupt is issued to CPU 101 (Step 1107), and the validity flag 341 of the notice table 242 is reset (Step 1108). If the validity flag 341 is set, if the reception report flag 344 is set, and if the interrupt information indicates a reception of data from a line 109 or the interrupt information indicates an occurrence of communication abnormality, then the interrupt information is registered in the report registered destination queue 207 (Step 1106), an interrupt is issued to CPU 101 (Step 1107), and the validity flag 341 is reset (Step 1108). If the request acceptance completion report flag 345 for the PTMP communication is set, the process is switched to a process 1109 of reporting a PTMP communication request acceptance completion (Step 1109).

In this manner, upon receiving an interrupt from the control module 107, the in-operation interface unit 103 performs a process suitable for the type of interrupt and issues an interrupt to CPU, only when the state is the master state.

Next, the PTMP communication process by an in-operation interface unit will be described with reference to FIGS. 12 to 14.

Figure 12:
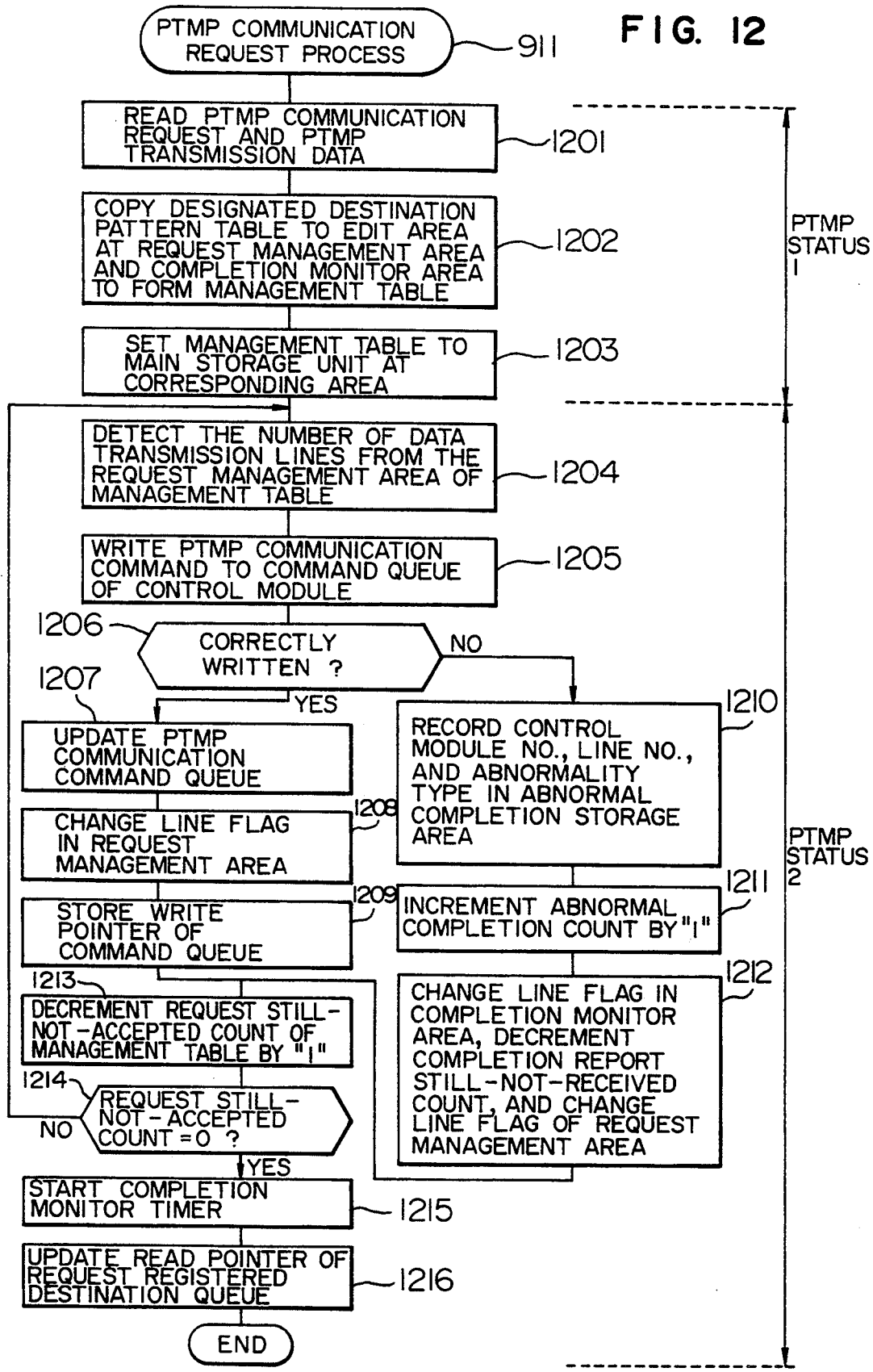
FIG. 12 is a flow chart illustrating the PTMP communication request process by the interface unit of the information communication system shown in FIG. 1.

FIG. 12 is a flow chart explaining the PTMP communication request process by an in-operation interface unit. The interface unit 103 switches the request process 900 to the PTMP communication request process 911 when the communication type is judged as the PTMP communication from the registration destination identification information supplied from CPU 101. In this process 911, in accordance with the identification information, the interface unit 103 reads the PTMP communication request from the area 322 of the PTMP communication request table 202, and transfers the transmission data from the transmission/reception buffer 114 to the buffer 115 in accordance with the contents of the PTMP communication request (Step 1201). The destination pattern table 500 designated by CPU 101 when the PTMP communication request was issued is copied from the work area 230 to the request management area 512 and completion monitor area 514 corresponding to the area 322 of the edit area 231, to form a management table for the PTMP communication (Step 1202). The table is then registered in the management queue 208 of the communication control interface 296 (Step 1203). Next, a destination line for the transmission data is detected from the request management area 512 of the edit area 231 (Step 1204), and a PTMP communication command is written at the area 333 of the command queue 241 indicated by the write pointer (Step 1205). The interface unit 103 checks whether the command was correctly written (Step 1206). If written correctly, the write pointer 331 in the command queue 241 is updated (Step 1207), and the line request flag in the request management area 512 of the management table 208 is changed from "1" to "0" (Step 1208). The write pointer 331 of the command queue 241 is stored in the line record element 402 of the control module field 404 which is contained in the PTMP communication record area 402 in the current write pointer table 210 of the main storage unit 102 (Step 1209). As a result of the check of the step 1206, if not written correctly, the serial number of the control module :not registered, the line number, and the abnormality type, are stored in the serial number record field 516 for the control module, the line number record field 517, and the abnormality type record field 518, respectively of the abnormality completion record area of the management table (Step 1210). The abnormality completion count 515 of the management table is incremented by "1" (Step 1211), and the line monitor flag of the completion monitor area 514 is changed from "1" to "0". The completion report still-not-received count 513 is decremented by "1", and the line request flag of the request management area 512 is changed from "1" to "0" (Step 1212). After the above processes, the request still-not-accepted count 511 of the management table is decremented by "1" (Step 1213) and it is judged whether the request still-not-accepted count 511 is "0" (Step 1214). If the count 511 is not "0", the next destination line for the transmission data is detected from the request management area 512 (Step 1204), and the above operations are repeated. If the judgement result at Step 1214 indicates that the count 511 is "0", it means that there is no line 109 to which the PTMP transmission data is sent. In order to monitor the acceptance completion report for the PTMP communication request from the control module 107, the interface unit 103 activates a completion monitor timer (Step 1215), updates the read pointer 302 of the request registered destination queue 200, and then discards the destination identification information to terminate the procedure. In this manner, the in-operation interface unit 103 fetches the PTMP transmission data from the main storage unit, and registers the PTMP communication command in the command queue 241 of each control module connected with data transmission lines, in accordance with the contents of the request management area 512 of the management table 208 generated from the destination pattern table 500.

The procedure from Steps 1201 to 1204 is called a PTMP status 1, and the procedure from Step 1204 is called a PTMP status 2. The statuses 1 and 2 are used as indices for the PTMP communication recovery process to be executed for the system switching process between the master/slave interface units 103.

When the destination pattern table 500 used by the PTMP communication request process is to be set to the work area 230, CPU 101 instructs the interface unit 103 by using a setting command. Prior to preforming the first PTMP communication after the system was set up, CPU 101 issues the setting command to the interface unit 103 to set all the destination pattern tables 500 to the work area 230. Upon reception of the setting command, the interface unit 103 sets all the destination tables 500 to the work area 230 in accordance with the contents of the setting command, and copies all the destination pattern tables 500 in the storing area 212 of the recovery interface 294 of the main storage unit 102. When data transmission to a line 109 becomes unnecessary because of an occurrence of line abnormality, CPU 101 changes the flag of the line in the destination pattern table 500 and thereafter issues the setting command. Upon reception of the setting command, the interface unit 103 sets again the changed destination pattern table in the work area 230 and storage area 212 in accordance with the contents of the setting commands.

The interface unit 103 collectively manages a plurality of management tables 208 corresponding to respective areas 322 of the request table 202, to thereby perform a plurality of PTMP communications.

Figure 13:
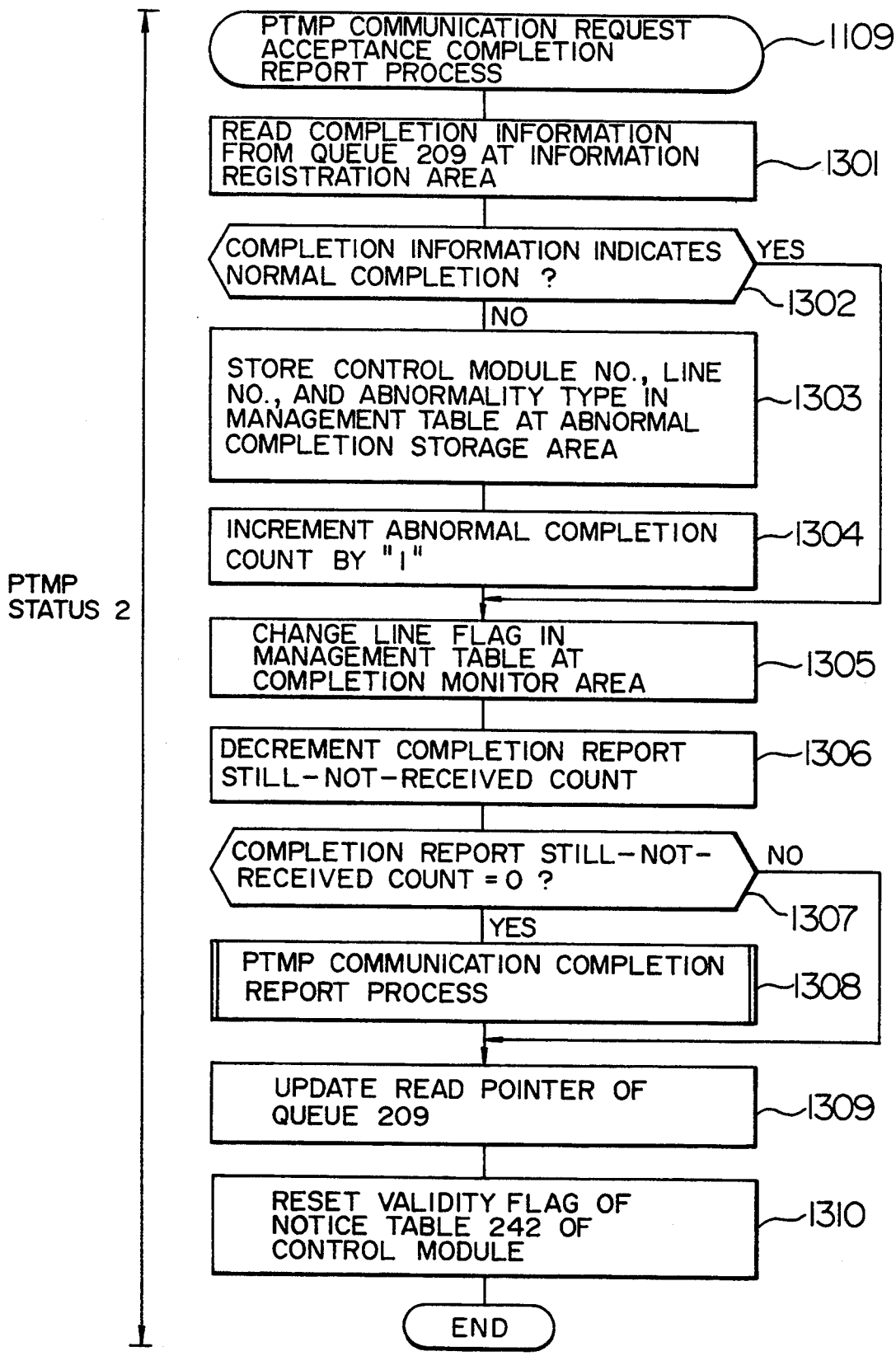
FIG. 13 is a flow chart illustrating the PTMP communication request acceptance completion report process by the interface unit of the information communication system shown in FIG. 1.

FIG. 13 is a flow chart showing the PTMP communication request acceptance completion report process by an in-operation interface unit.

If the type of the interrupt report from the control module 107 of the communication control unit 105 is the PTMP communication request acceptance completion report, the interface unit 103 switches from the interrupt reception process 1100 to a request acceptance completion report process 1109 for the PTMP communication. In the report process 1109, the interface unit 103 identifies the PTMP communication acceptance completion report queue 209 based on the contents of the notice table 242, and reads the completion information from the queue 209 at the area 313 indicated by the read pointer 312 (Step 1301). It is then checked whether the completion information indicates a normal completion or not (Step 1302). Only in the case of an abnormal completion, the serial number of the control module, the line number, and the abnormality type, are stored in the control module serial number record field 516, the line number record field 517, and the abnormality type record field 518, respectively of the abnormal completion record area of the management table (Step 1303). The abnormal completion count 515 of the management table is incremented by "1" (Step 1304), and the interface unit 103 changes the line 109 monitor flag of the completion monitor area 514 from "1" to "0" (Step 1305). That the request acceptance completion report has been received from the line 109 is recorded, and the completion report still-not-received count 513 of the management table is decremented by "1" (Step 1307). It is judged whether the count 513 is "0" (Step 1307). If the count 513 is not "0", the read pointer 312 of the queue 209 is updated (Step 1309), the completion information is discarded, and the validity flag 341 of the notice table 242 of the control module 107 is reset (Step 1310) to terminate the procedure. If the judgement result at Step 1307 indicates that the count 513 is "0", it means that all the acceptance completion reports for the PTMP communication request have been received from respective control modules 107 so that the process is switched to the PTMP communication completion report process 1308 to report a PTMP communication completion to CPU 101 (Step 1308). The read pointer 312 of the queue 209 is updated (Step 1309), the completion information is discarded, and the validity flag 341 of the notice table 242 of the control module 107 is reset ,(Step 1310) to terminate the procedure. The status as an index for the PTMP communication recovery process for the system switching between the interface units is the PTMP status 2 during the above procedure.

Figure 14:
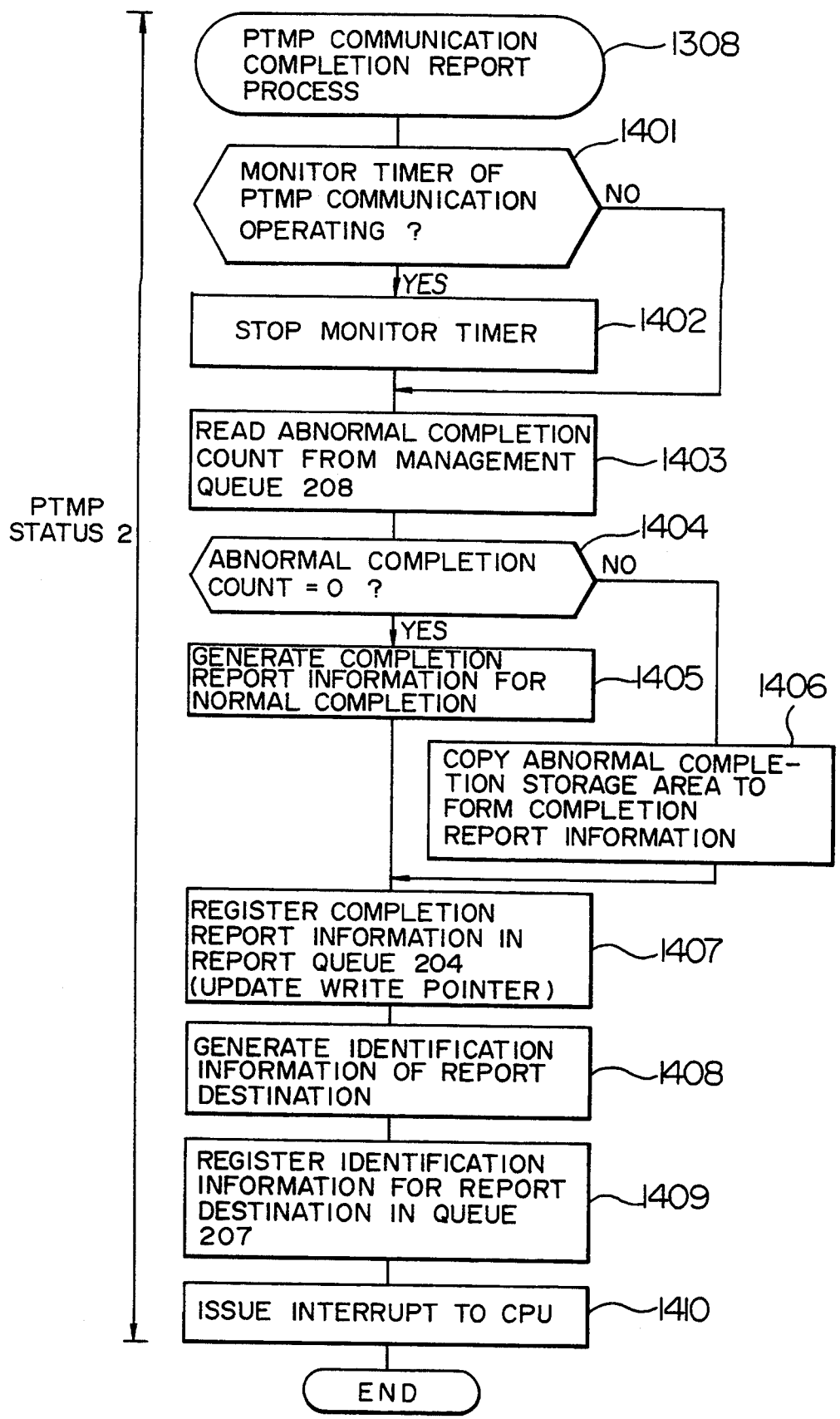
FIG. 14 is a flow chart illustrating the PTMP communication completion report process by the interface unit of the information communication system shown in FIG. 1.

FIG. 14 is a flow chart showing the PTMP communication completion report process by an in-operation interface unit. When the interface unit 103 detects that all the acceptance completion reports for the PTMP communication request have been received from the respective control modules 107, the interface unit 103 switches from the report process 1109 to the PTMP communication completion report process 1308.

In the process 1308, the interface unit 103 checks whether a communication completion monitor timer is operating (Step 1401). If in operation, the monitor timer is stopped (Step 1402). Next, the abnormal completion count 515 is read from the management table at the edit area 231 (Step 1403) to check if the count 515 is "0" (Step 1404). If "0", the PTMP communication is regarded as a normal completion, and completion report information is generated (Step 1405). If the count 515 is not "0", the contents of the abnormal completion record area of the management table is copied to generate the completion report information (Step 1406). The generated completion report information is written in the report queue 2204 of the main storage unit 102 at the area 313 indicated by the write pointer 311, and thereafter the write pointer 311 is updated (Step 1407). Interrupt report destination information is generated for notifying CPU 101 of the registration of the completion report information (Step 1408), and registered in the report registered destination queue 207 at the area 303 indicated by the write pointer 301 to thereafter update the pointer 301 (Step 1409). An interrupt is issued to CPU 101 to terminate the procedure (Step 1410). The processes up to issuing an interrupt to CPU 101 belong to the PTMP status 2, and are subjected to the PTMP communication recovery process for the system switching between the interface units 103.

In the above manner, each time an in-operation system interface unit 103 receives from the control module of the communication control unit a PTMP communication request acceptance completion report, the line monitor flag in the completion monitor area 514 of the management table 208 is set to "0" to store the reception of the report. When all the communication request acceptance completion reports for lines via which the PTMP transmission data are sent are received from the control modules, a PTMP communication completion is reported to CPU 101.

If the monitor timer counts up before the necessary number of acceptance completion reports for the PTMP communication request cannot be received from the respective control modules, the interface unit 103 stops receiving the acceptance completion report for the PTMP communication request from the control modules 107. Next, the interface unit 103 searches the line not receiving the request acceptance completion report from the control module 107, i.e., the line with the monitor flag "1" in the completion monitor area 514 of the management table, and considers this line to be in an abnormal completion. In this case, the control module number, line number, and abnormal type caused by the timer count-up are recorded in the abnormal completion storage area of the management table, and the abnormal completion count 515 is incremented. After writing such information in the abnormal completion storage area for all the lines with the flag "1" in the completion monitor area 514, the interface unit 103 switches its process to the PTMP communication completion report process 1308 and reports the PTMP communication completion to CPU 101.

In the PTMP communication process described with FIGS. 12, 13, and 14, the management table in the edit area 231 of the interface unit 103 is used as described previously. Information is also registered at the same time in the management table 208 of the communication interface 296, when decrementing the request still-not-accepted count 511 and completion report still-not-received count 513, changing the flags in the request management area 512 and completion monitor area 514, and writing information to the abnormal completion storage area.

Figure 15A:
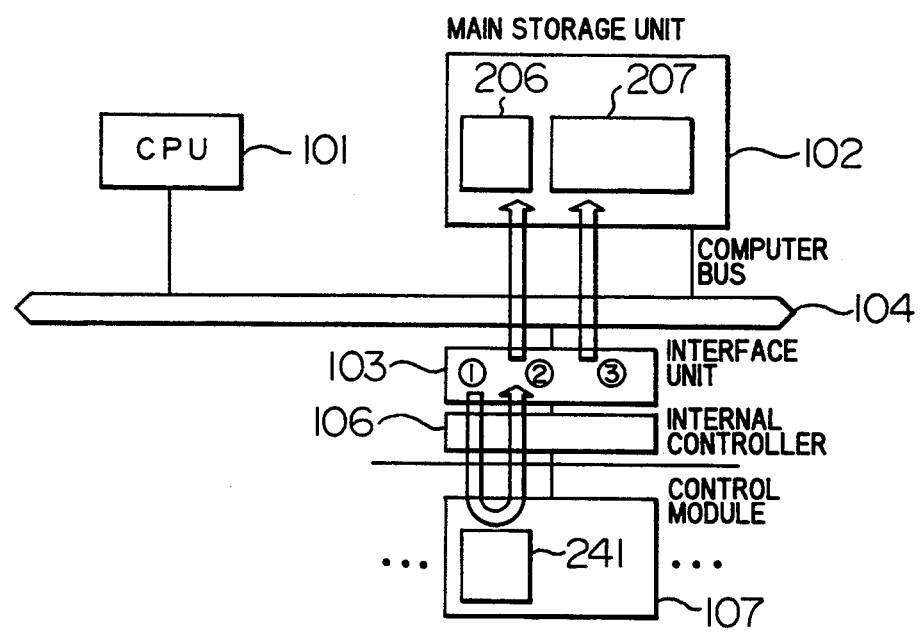
FIGS. 15A and 15B are schematic diagrams illustrating the procedure to be executed by the interface unit and control module of the information communication system shown in FIG. 1, in accordance with the valid number of PTMP communication commands.

FIG. 15A shows the procedure of notifying the remaining effective command in the PTMP communication command queue 241, from the interface unit 103 to CPU 101. When the throughput of the line 109 lowers because of some abnormality, the control module 107 cannot receive an acknowledgement from the line 109. If such a state continues long, each command queue 240, 241 may become full. In order to deal with this, the interface unit 103: (1) periodically reads the write pointer 331 and read pointer 332 of the PTMP command queue 241 to check the remaining effective command in the queue 241. When the number of effective commands in the queue 241 exceeds a predetermined number or the number of effective commands exceeding the predetermined number becomes smaller than a predetermined number, the interface unit 103: (2) registers information representing such state change in the communication interrupt report queue 206. In order to notify CPU 101 of the state change, the interface unit 103: (3) registers identification information of a report destination in the report destination queue 207, and issues an interrupt. When the interrupt indicates that the number of remaining effective commands in the command queue 241 exceeded the predetermined number, CPU 101 resets the line flag in the destination patter table 500 to "0" so as not to transmit data to the line 109 corresponding to the command queue 244, and notifies the interface unit 103 of such effect by using the setting command for the destination pattern table. In this manner, the interface unit periodically monitors the remaining command in the command queue 241 to prevent the communication queue 241 from becoming full of commands.

The number of areas 313 of the command queue 240 is set equal to the number of areas 313 of the PTP communication request queue 201. The PTP communication process at the interface unit 103 and control module 107 is controlled so that the numbers of effective commands in both the queues become always the same. In this manner, CPU 101 inhibits data transmission request to the line 109 corresponding to the command queue 240 full of effective commands.

Figure 15B:
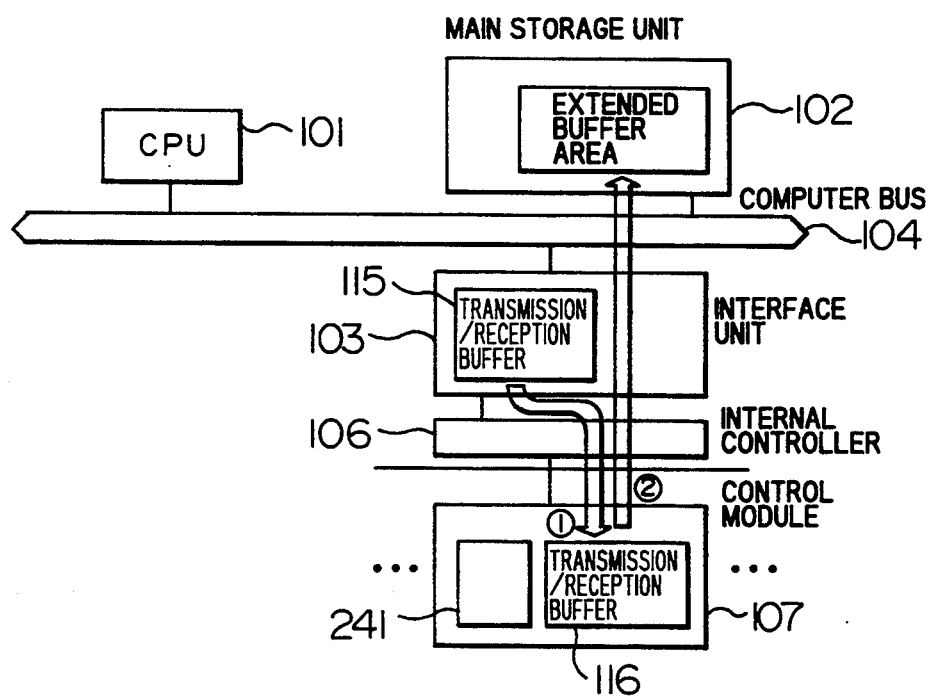

FIG. 15B shows the procedure by the control module 107 when the PTMP communication command registered from the interface unit 103 in the command queue 241 exceeds the predetermined number. The control module 107: (1) reads the PTMP communication command registered by the interface unit 241 from the command queue 241, and in accordance with the contents of the command, reads the PTMP transmission data from the transmission/reception buffer 115 to the buffer 116. If the PTMP communication command registered in the command queue 241 exceeds the predetermined number, the control module 107: (2) transfers the PTMP transmission data from the transmission/reception buffer 116 to the extended buffer 292. In transmitting the PTMP transmission data stored in the extended buffer 292 to the line 109, the control module 107 transfers the PTMP transmission data directly from the extended buffer 292 to the transmission/reception buffer 116 and transmits to the line 109.

In this embodiment described above, there is provided the information communication system having a host computer and a duplexed communication control block group, the host computer being constituted by a CPU block, a duplexed communication interface block, and a main storage block. A communication management queue is provided for each type of communication, and the communication process is distributively performed by the CPU block, communication interface block, and communication control unit group. As a result, the load of each CPU can be reduced even when different services are provided by using same lines.

Next, the recovery process will be described for managing the status of the duplexed interface unit, switching between two systems, and ensuring the data integrity. First, switching between the in-operation (master) system and stand-by (slave) system of the duplexed interface unit will be described.

As described previously, the master/slave state of the interface unit 103 is determined from the state of the interface channels 117. The transition of the state of the interface unit 103 can be executed by a command of changing the state of the interface unit 103, namely, by a channel connection/disconnection command for instructing the connection/disconnection between the internal bus controller 106 connected to the channel 117 of the interface unit 103 and the internal bus 108. This command is transferred via the table 220, 221 of the configuration control interface 298.

Figure 16:
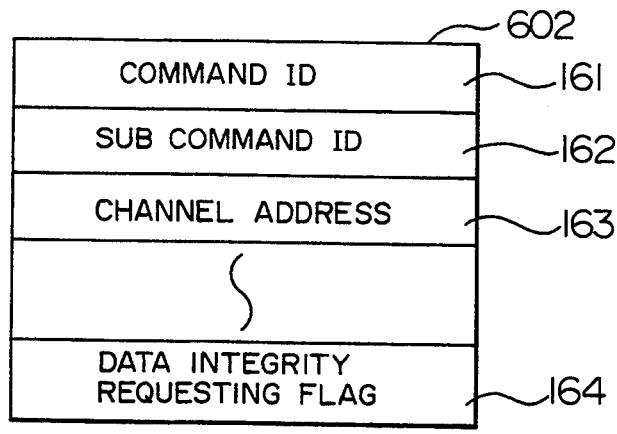
FIG. 16 shows the format of an interface channel connection/disconnection command to be used for switching between duplexed systems by the interface unit of the information communication system shown in FIG. 1.

FIG. 16 shows the request information set in the request information setting area of the request message table 220 of the configuration control interface 298 of the main storage unit 102 when the channel connection/disconnection command is requested. In FIG. 16, reference numeral 161 represents a command ID indicating whether the command is for the channel connection/disconnection, reference numeral 162 represents a sub command ID indicating whether the contents of the command ID 161 indicate the connection/disconnection of all the channels 117 of the interface unit 103 or of a particular channel 117, reference numeral 163 represents a channel address of the particular channel 117 requested by the sub command ID 162, this channel address being effective only when the sub-command ID 162 requests for the connection/disconnection of the particular channel 117, and reference numeral 164 represents a data integrity request flag indicating a presence/absence of the communication process inheritance request at the original master state when the interface unit 103 is changed from the slave state to the master state by a channel connection command. In the switching of the interface unit 103 between the in-operation system and the stand-by system, the sub command ID 162 requests for the connection/disconnection of either all the channels or of the particular channel such as when one communication control unit 105 is added or replaced. The request flag 164 is therefore effective only when the sub command ID 162 requests for all the channels at the channel connection command.

The process of receiving the channel connection/disconnection command at a communication interface unit will be described with reference to FIGS. 17 and 18.

Figure 17:
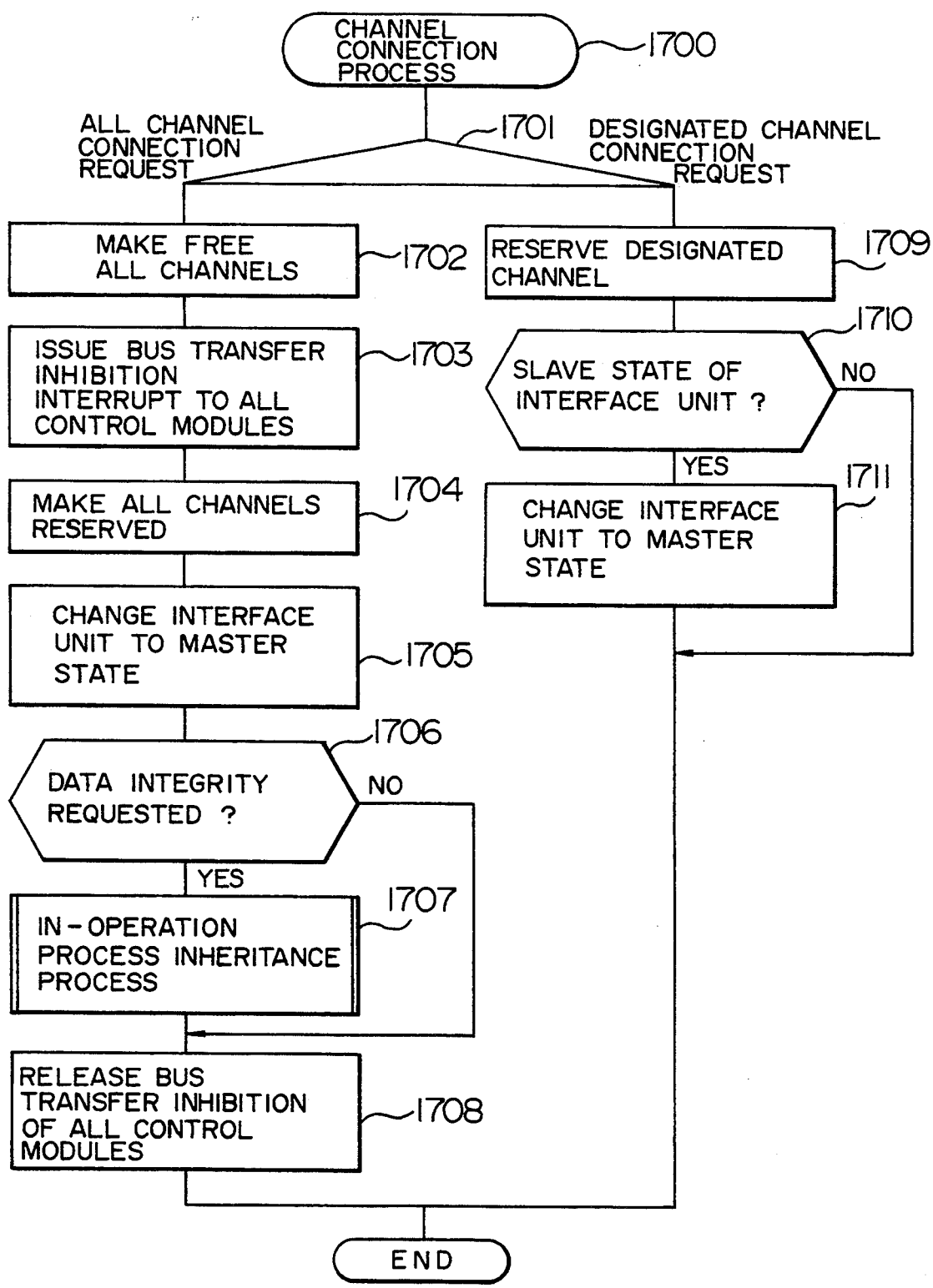
FIG. 17 is a flow chart illustrating an interface channel connection process by the interface unit of the information communication system shown in FIG. 1.

FIG. 17 is a flow chart explaining the operation when an interface unit receives the channel connection command from CPU 101 via the configuration control interface 298. Upon reception a request from CPU 101, the interface unit 103 fetches the contents of the request information setting area 602 of the message table 220. The interface unit 103 recognizes a request of the channel connection command from the command ID 161, and executes a channel connection process 1700. In this process 1700, the sub command ID 162 is first checked (Step 1701). If the sub command ID 162 indicates a request for all the channels, the internal bus controllers 106 presently connected to all the channels are logically disconnected from the internal busses (Step 1702), and a bus transfer inhibit interrupt is issued to all the control modules 107 of the communication control units 105 connected to the channels 117 (Step 1703). Then, the internal bus controllers 106 connected to all the channels 117 are logically connected to the internal busses 108 (Step 1704), to change the state of the interface unit 117 to the master state (Step 1705). Thereafter, the request flag 164 is checked (Step 1706). If the data integrity is requested, an in-operation system inheritance process is executed (Step 1707) to release the bus transfer inhibit of all the control modules 107 of the communication control units 105 connected to the channels 117. In this case, no operation is executed if the interface unit 103 received the channel connection command for all the channels is in the master state. On the other hand, if the sub-command ID 162 indicates a request for the connection to a particular channel, the internal bus controller 106 connected to the particular channel 117 indicated by the channel address 163 is logically connected to the internal bus 108 (Step 1709). The state of the interface unit 103 is then checked (Step 710). If in the slave state, it is changed to the master state (Step 1711).

Figure 18:
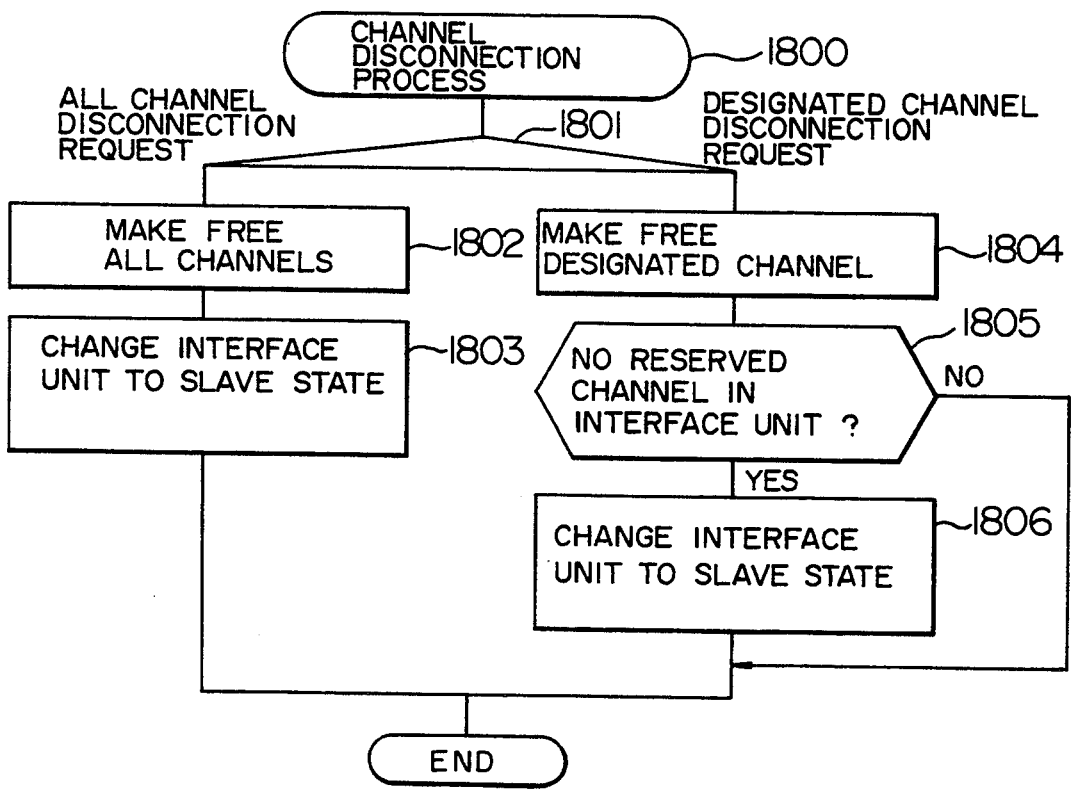
FIG. 18 is a flow chart illustrating an interface channel disconnection process by the interface unit of the information communication system shown in FIG. 1.

FIG. 18 is a flow chart explaining the operation when an interface unit receives the channel disconnection command from CPU 101 via the configuration control interface 298. Upon reception of a request from CPU 101, the interface unit 103 fetches the contents of the request information setting area 602 of the message table 220. The interface unit 103 recognizes a request of the channel disconnection command from the command ID 161, and executes a channel disconnection process 1800. In this process 1800, the sub command ID 162 is first checked (Step 1801). If the sub command ID 162 indicates a request for the disconnection of all the channels, the internal bus controllers 106 presently connected to all the channels are logically disconnected from the internal busses (Step 1802), to change the state of the interface unit 103 to the slave state (Step 1803). If the sub command ID 162 indicates a request for the disconnection of a particular channel, the internal bus controller 106 connected to the channel 117 indicated by the channel address 163 is logically disconnected from the internal bus 108 (Step 1804). The states of other channels are checked (Step 1805). If there is a reserved channel, the state of the interface unit 103 is changed to the slave state (Step 1806). In this case, no operation is executed if the interface unit 103 received the channel disconnection is in the slave state. The interface unit 103 received the channel disconnection command and changed from the master state to the slave state intercepts all the internal communication processes, and inhibits thereafter receiving the request from the communication control interface 298 and an interrupt, as described previously with FIGS. 9 and 11.

Next, the procedure of switching between the in-operation system and stand-by system of the duplexed interface unit will be described with reference to FIGS. 19 and 20. The switching between the in-operation system and stand-by system of an interface unit 103 includes a switching upon failure and a switching for maintenance. The former switching is performed when any failure occurs at the in-operation system interface unit 103-a, at an interconnection path (extended bus cable 118, internal bus controller 106) between the communication control unit 105 and in-operation system interface unit 103-a, or at the internal bus 108 of the communication control unit 105. The latter switching is performed periodically upon key operation on a console by an operator.

FIG. 19 shows the procedure of the switching upon failure between the in-operation and stand-by systems of a duplexed interface unit. When CPU 101 detects a failure at the in-operation system interface unit 103-a, at an interconnection path (extended bus cable 118, internal bus controller 106) between the communication control unit 105 and in-operation system interface unit 103-a, or at the internal bus 108 of the communication control unit 105, it instructs the in-operation system interface unit 103-a to stop the operation of MPU 112-a, and issues a channel connection command (all channel connection and data integrity requests) to the stand-by interface unit 103-b. Upon reception of this command, the stand-by system interface unit 103-b executes Steps 1702 to 1708 of the channel connection process 1700 described previously.

A failure detection at each system element is performed by using the following means. A failure at the interface unit 103-a is monitored by a periodical access from CPU 101 and by the interface unit 103 itself (by using a watch dog timer or the like). A failure at the internal structure (internal bus controller 106, control module 107, internal bus 108) of the communication control unit 105 is monitored by a periodical access check by the in-operation interface unit 103-a. The in-operation interface unit 103-a detects a failure and informs CPU 101 of the failure detection.

FIG. 20 is a diagram showing the procedure of the maintenance switching between the in-operation system and stand-by system of the duplexed interface unit. An operator keys in from the console to request the switching between the in-operation and stand-by systems of an interface unit. CPU 101 detecting this key-in issues a channel disconnection command (all channel disconnection) to the in-operation interface unit 103-a. Upon reception of the command, the in-operation interface unit 103-a executes Steps 1802 and 1803 of the channel disconnection process 1800 described previously, and thereafter informs CPU 101 of the execution completion. Upon reception of the execution completion, CPU 101 issues a channel connection command (all channel connection and data integrity requests) to the stand-by interface channel 103-b which in turn executes Steps 1702 to 1708 of the channel connection process 1700 described previously. In this manner, using the channel connection/disconnection command, the in-operation interface unit 103-a is switched to the stand-by interface unit 103-b to logically disconnect the internal bus controller 106-a from the internal bus 109 and disconnect the internal bus controller 106-b from the internal bus 108.

Referring to FIGS. 21 to 26, there will be described an in-operation system process inheritance process by the interface unit having received the channel connection command (.all channel connection and data integrity requests).

Figure 21:
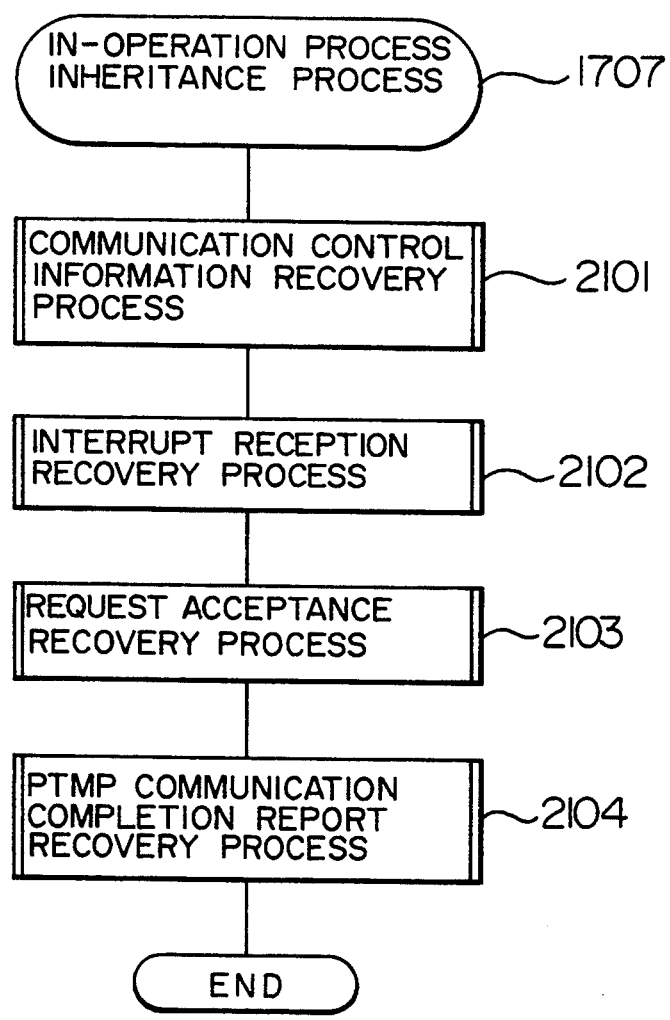
FIG. 21 is a flow chart illustrating the in-operation system inheritance process by the interface unit of the information communication system shown in FIG. 1.

FIG. 21 is a flow chart showing the entirety of the in-operation system process inheritance. In the in-operation system process inheritance process 1707, a process is first executed wherein the communication control information used by the PTMP communication process described previously is recovered to the interface unit 103 (Step 2101). Next, a recovery process is executed for inheriting the process of receiving an interrupt from the control module 107 of the communication control unit 105 (Step 2102). Then, a recovery process is executed for inheriting the process of accepting a request from CPU 101 via the communication control interface 296 (Step 2103). Lastly, a recovery process is executed for inheriting the completion report process of the PTMP communication process (Step 2104).

Figure 22:
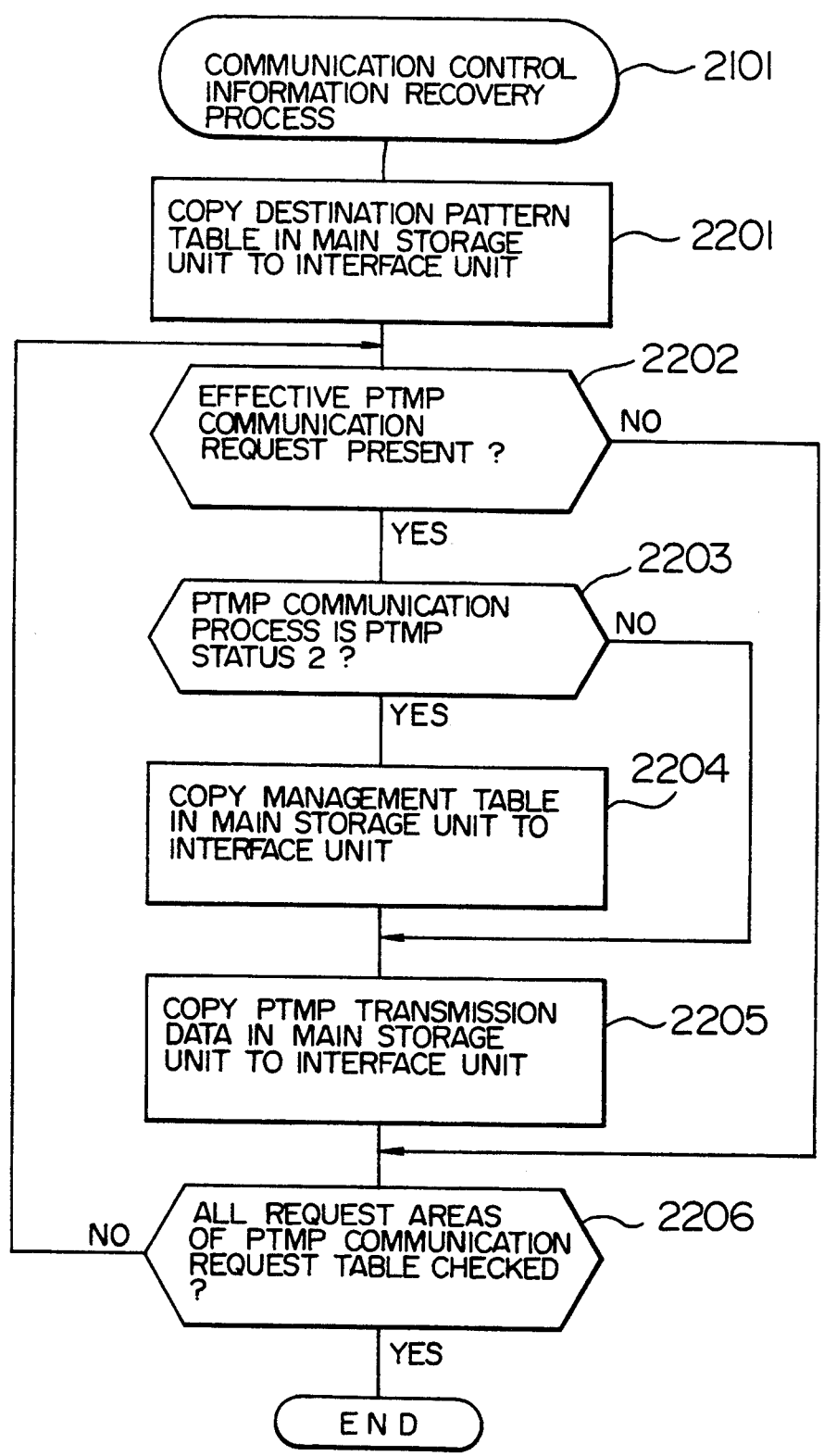
FIG. 22 is a flow chart illustrating the communication control information recovery process in the in-operation system inheritance process by the interface unit of the information communication system shown in FIG. 1.

FIG. 22 is a flow chart showing a process 2101 of recovering the communication control information used by the PTMP communication process to the communication control interface 296. In this recovery process 2101, all the destination pattern tables 500 in the storage area 212 of the recovery interface 294 in the main storage unit 102 are copied to the work area 230 of the interface unit 103 (Step 2201). Next, It is checked, from the request flags 321 of the PTMP communication request table 202 of the communication control interface 296, whether there is a valid PTMP communication request (Step 2202). If there is an effective PTMP communication request, it is checked whether the PTMP communication process is in the status 2 (Step 2203). If in the status 2, the management table 208 of the interface 296 is copied to the edit area 231 of the interface unit 103 (Step 2204). If not, it is not copied. If there is no effective communication request, no operation is performed. The transmission data for the PTMP communication request is copied from the transmission/reception buffer 114 to the buffer 115 (Step 2205). Of the above process, Steps 2202 to 2205 are repeated as many times as the number of information registration areas of the request table 202 (Step 2206). In this manner, only the information at the in-operation system necessary for the PTMP communication process can be recovered to the stand-by system interface unit prior to executing the actual process inheritance.

Figure 23:
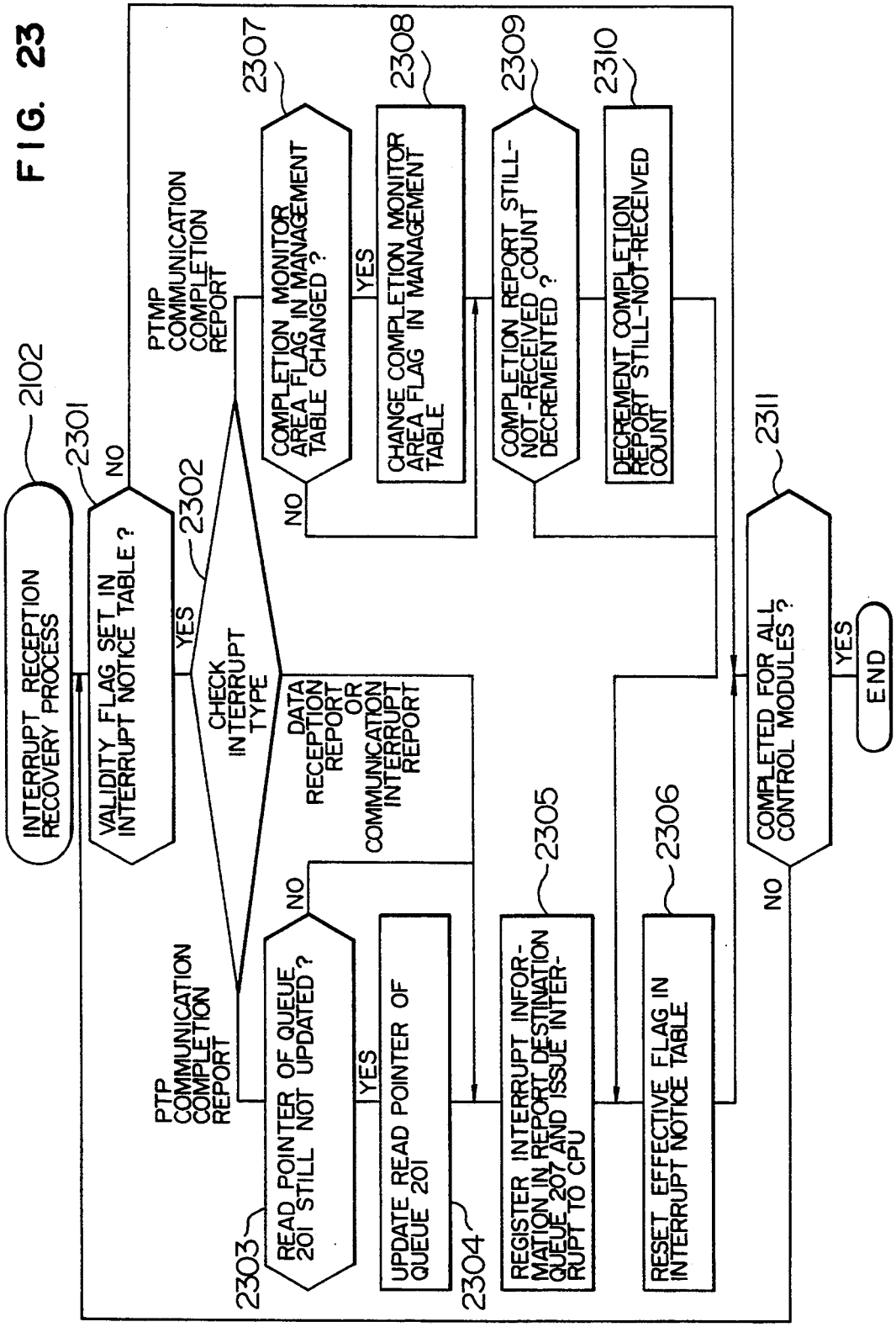
FIG. 23 is a flow chart illustrating the interrupt reception recovery process in the in-operation system inheritance process by the interface unit of the information communication system shown in FIG. 1.

FIG. 23 is a flow chart showing a recovery process 2102 of inheriting the process of receiving an interrupt from the control module of a communication control unit. In this recovery process 2102, it is first checked whether the validity flag 341 of the notice table 242 of each control module 107 of the communication control unit 105 connected to the interface unit 103 is set (Step 2301). If being set, the type of interrupt is identified from each report flag 342 to 345 of the notice table 242 (Step 2302). If the interrupt is for the PTMP communication completion report, it is checked, from the read pointer 312 in the request queue 204 indicated by the notice table 242 and the write pointer 311 in the completion report queue 204, whether the updating process for the read pointer 312 of the request queue 201 has been completed (Step 2303). If not (if the read pointer 312 is coincide with the write pointer 311), the read pointer 312 is updated (Step 2304). The interrupt information of the notice table 242 is registered in the report destination queue 207, and an interrupt is issued to CPU 101 (Step 2305). The validity flag 341 of the notice table 242 is reset (Step 2306). If the interrupt is for the data reception or communication interrupt report, only Steps 2305 and 2306 of the above process are executed. If the interrupt is for the PTMP communication request acceptance completion report, it is checked whether the monitor flag of the completion monitor area 514 of the management table 208 indicated by the notice table 242 has been changed from "1" to "0" (Step 2307). If "1", the monitor flag is changed to "0" (Step 2308). It is checked, from the count (Ma) of the monitor flags "1" in the completion report area 514, whether the decrement operation for the completion report still-not-received count 513 (Mb) has been completed (Step 2309). If not (if Ma<Mb), the completion report still-not-received count 513 is decremented (Step 2310). If the validity flag 341 is reset, no operation is performed. The process Steps 2301 to 2310 are repeated as many times as the number of all control modules 107 of the communication control unit 105 connected to the interface unit 103 (Step 2311). In this manner, various types of interrupts from all control modules 107 of the communication control unit 105 connected to the interface unit 103 can be received without fail.

Figure 24:
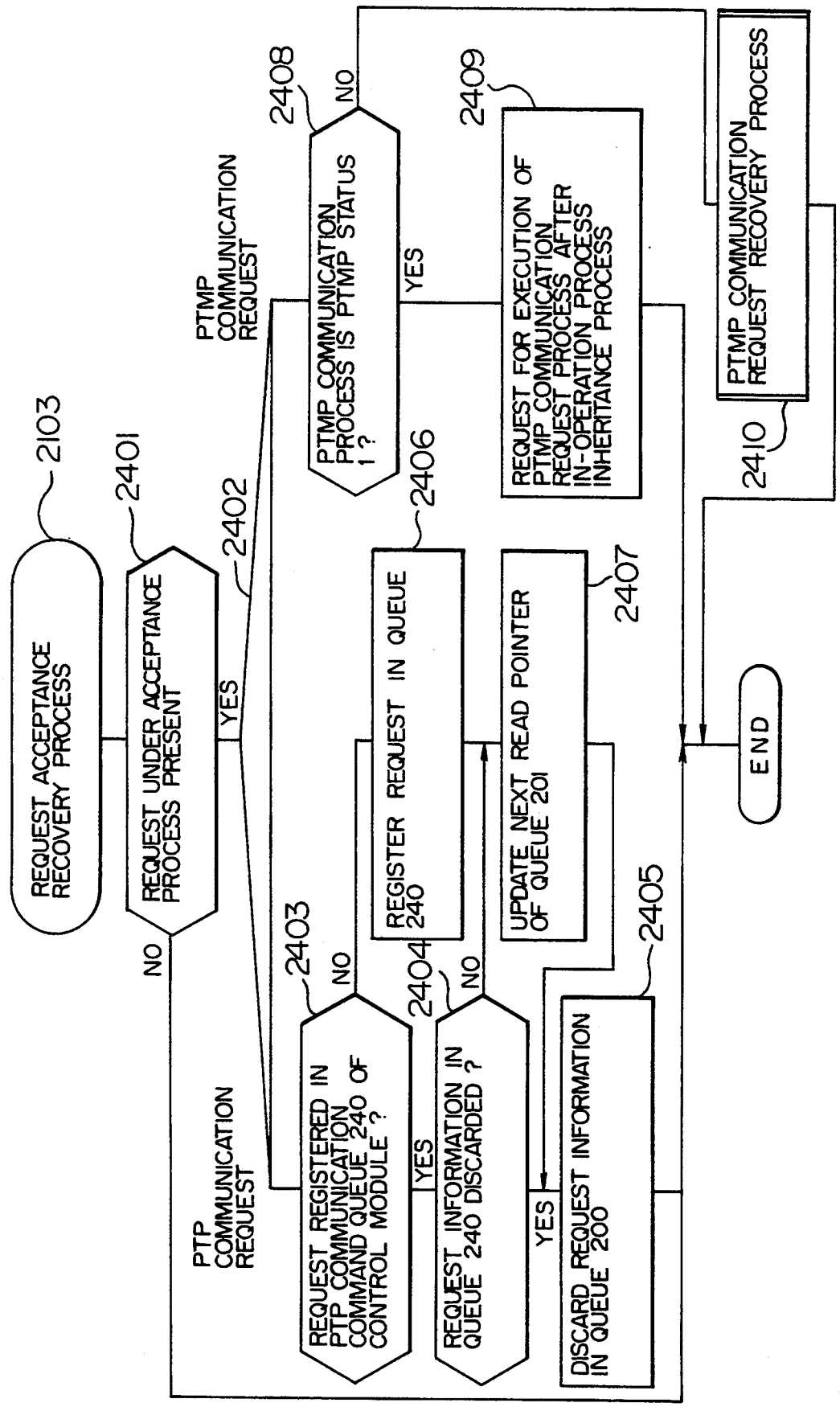
FIG. 24 is a flow chart illustrating the request acceptance recovery process in the in-operation system inheritance process by the interface unit of the information communication system shown in FIG. 1.

FIG. 24 is a flow chart showing a recovery process of inheriting the process of accepting a request from CPU 101 via the communication control interface. In this recovery process 2103, it is checked, from the read pointer 302 of the destination queue 200 of the communication control interface 296 and the value of the queue 2000 record field 410 of the next read pointer table 211 of the recovery interface 294, whether the in-operation interface unit 103 has been operating in the command acceptance process via the communication control interface 296 (Step 2401). If in the command acceptance process (if the read pointer 302 is not coincident with the next read pointer), the destination identification information is checked which is registered in the information registration area 303 of the read pointer 302 of the queue 200 (Step 2402). The following request inheritance process is performed thereafter. If the destination identification information indicates the PTP communication request, it is checked, from the write pointer 311 of the PTP communication command queue 240 of the control module 107 identified by the identification information and the current write pointer of the current write pointer table 210 of the recovery interface 294, whether the PTP communication command in the area 313 indicated by the read pointer 312 of the request queue 201 identified by the identification information has been registered in the command table 240 (Step 2403). If not (if the write pointer 311 is coincident with the current write pointer), the PTP communication command is registered in the command queue 240 (Step 2406), and the next read pointer in the request queue 201 of the next read pointer table 211 is updated (Step 2407). If the PTP communication command has been registered in the command queue 240, it is checked, from the read pointer 312 of the request queue 201 and the next read pointer of the next read pointer table 211, whether the next read pointer of the request queue 201 has been updated (Step 2404). If not, Step 2407 is executed and thereafter, the identification information in the queue 200 is discarded (Step 2405). If the identification information indicates the PTMP communication, it is checked whether the PTMP communication process is in the PTMP status 1 (Step 2408). If in the PTMP status 1, after the completion of the in-operation system process inheritance process 1707, the PTMP communication request process 1200 is requested to be executed (Step 2409). If not in the PTMP status 1, the recovery process for the PTMP communication request is executed (Step 2410). In this manner, various types of request from CPU 101 via the communication control interface can be executed without any fail or duplication. The request acceptance process at the communication control interface is limited only to one request so that it is sufficient for the request acceptance recovery process to deal with the one request at a time.

Figure 25:
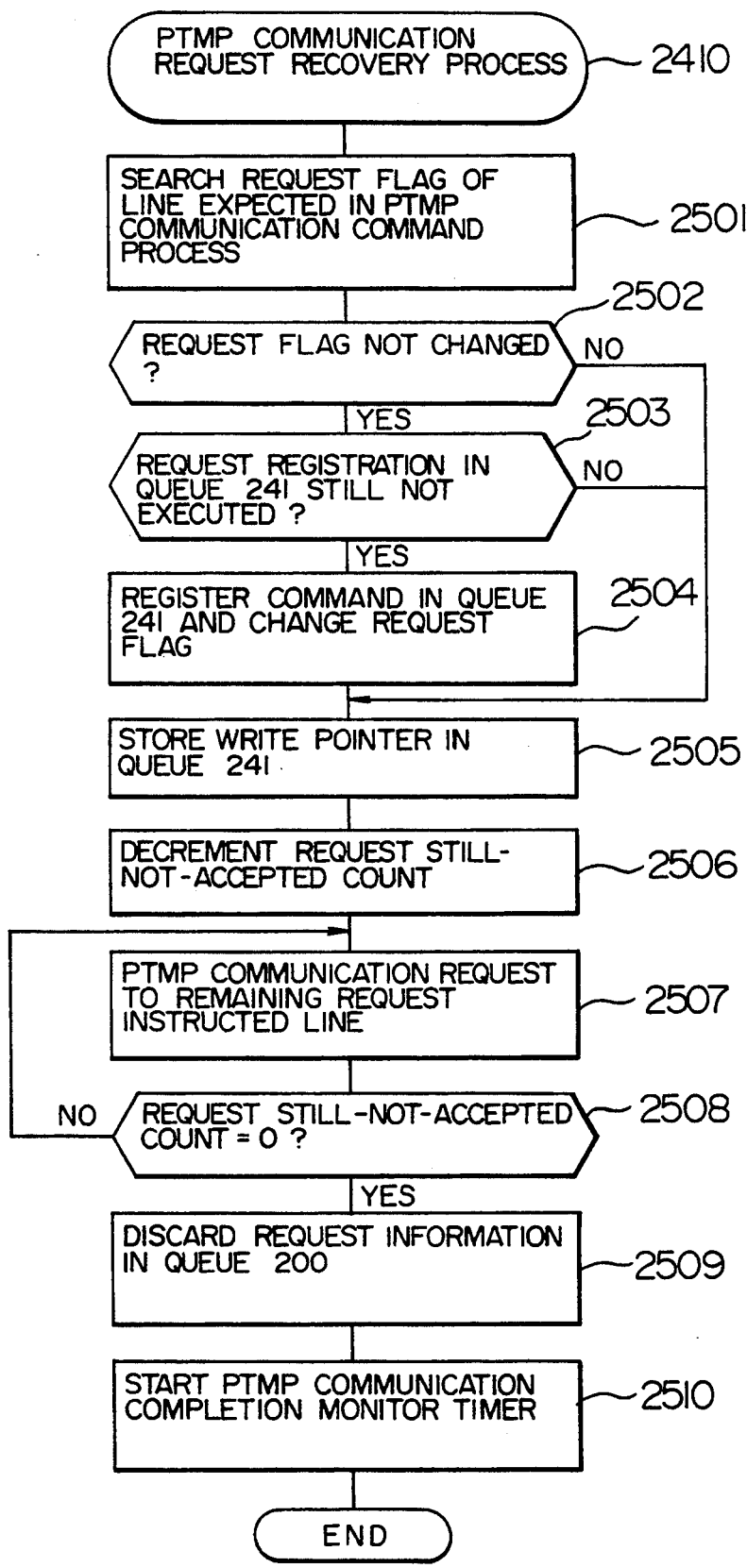
FIG. 25 is a flow chart illustrating the PTMP request recovery process to be executed by the request acceptance recovery process in the in-operation system inheritance process by the interface unit of the information communication system shown in FIG. 1.

FIG. 25 is a flow chart showing a recovery process 2410 of inheriting the PTMP communication request process to the control module of a communication control unit during the process of accepting a PTMP communication request from CPU 101 via the communication control interface 296. In this recovery process 2410, a line expected to be in the PTMP communication request process is detected in accordance with the request still-not-accepted count 511 in the management table at the edit area 231 of the interface unit 103 and the number of requested lines obtained from the destination pattern table 500 (Step 2501). It is checked whether the request flag for the detected line in the management table at the request management area 512 has been changed (Step 2502). If not (if the request flag is "1"), it is checked, from the from the write pointer 321 of the command queue 241 of the control module 107 covering the line and the current pointer in the PTMP communication record area 402 at the line record element 406 of the current write pointer table 210 of the recovery interface 294, whether the PTMP communication command has been registered in the command queue 241 (Step 2503). If the command has not been registered (if the write pointer 331 is coincident with the current write pointer), the PTMP communication command is registered in the command queue 241 and the request flag is changed to "0" (Step 2504). The write pointer 331 of the command queue 241 is stored in the current write pointer table 210 at the line record element 406 in the PTMP communication record area 402 (Step 2505), and thereafter the request still-not-accepted count 511 of the management table is decremented by "1" (Step 2506). The PTMP communication request process (Steps 1205 to 1214 of the PTMP communication process 1200) is repeated for the remaining request process (Step 2507) until the request still-not-accepted count 511 in the management table becomes "0" (Step 2508). The identification information of the destination is discarded from the queue 200 (Step 2509). After the completion of the in-operation system process inheritance process 1707, a monitor timer for monitoring the completion of the PTMP communication process is started (Step 2510). In this manner, in the PTMP communication process during the request process at each control module of the communication control unit designated by the interface unit, data transmission to lines can be inherited without any fail or duplication.

Figure 26:
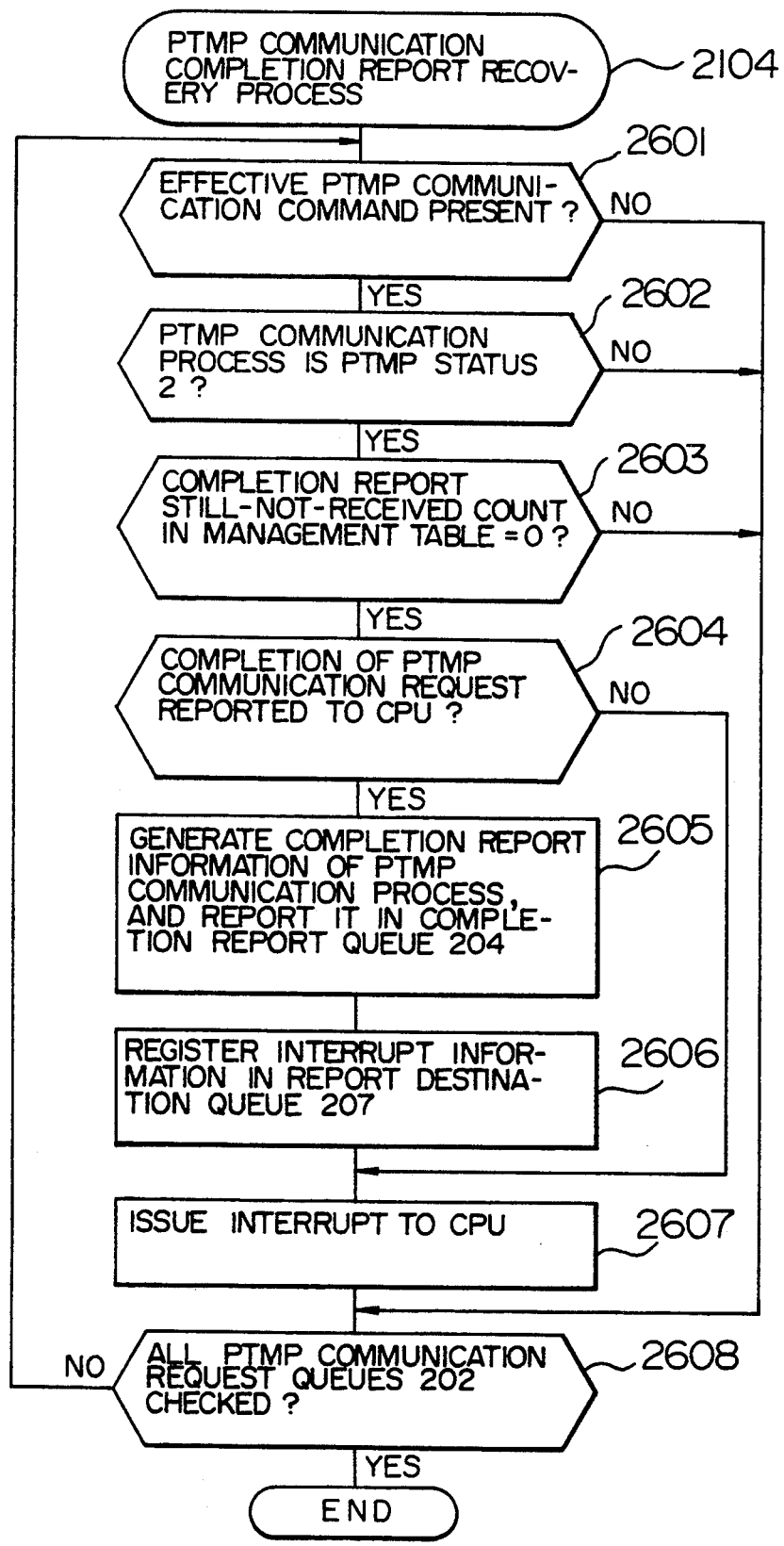
FIG. 26 is a flow chart illustrating the PTMP communication completion report recovery process in the in-operation system inheritance process by the interface unit of the information communication system shown in FIG. 1.

FIG. 26 is a flow chart showing a recovery process 2104 of inheriting the completion report process in the PTMP communication process. In this recovery process 2104, whether there is an effective communication command is checked from the request flags 321 of the request queue 202 of the communication control interface 296 (Step 2601). If there is an effective communication command, it is checked whether the PTMP communication process is in the PTMP status 2 (Step 2602). If in the PTMP status 2, it is checked whether the non-completion report count 513 of the management table at the edit area 231 of the interface unit 103 is "0" (Step 2603). If "0", ill is checked whether the completion report information for the management table whose completion report still-not-received count 513 is "0" is contained in the effective completion report information registered in between the area 313 defined by the write pointer 311 and read pointer 312 of the completion report queue 204 (Step 2604). If not, the completion report information for the PTMP communication process is generated from the management table and registered in the completion report queue 204 (Step 2605). The identification information of the interrupt report destination for the PTMP communication completion report is registered in the report registered destination queue 207 (Step 2606), and an interrupt is issued to CPU 101 (Step 2607). Steps 2601 to 2607 are repeated as many times as the number of information registration areas of the request queue 202 (Step 2608). In this manner, the PTMP communication completion report process for CPU 101 can be inherited.

According to the embodiment described above, the history of past processes before the switching between the in-operation interface unit and stand-by systems interface unit can be supplied from the main storage unit of a fault tolerant computer. Accordingly, it is possible to provide an information communication system of high reliability capable of inheriting the history of past processes before the switching between the in-operation and stand-by systems when the communication interface unit or the internal bus controller of the communication control unit becomes defective.

As described so far, according to the present invention, data communication report tables are provided for each type of communications including PTP and PTMP communications so that such communications can be realized by using same lines. Further, destination pattern tables storing communication destinations are used for the PTMP communication request process so that the capacity of PTMP communication request information will not change with the number of communication destinations, reducing the necessary capacity of request information. Furthermore, the data communication process is distributively executed among CPUs and interface units of a host computer and control modules of the communication control units, realizing an information communication system capable of reducing the load of CPUs and supporting a PTMP communication for the transmission of same data to a plurality of lines in a short time.

According to the present invention, the host computer and communication control unit are each duplexed. Accordingly, even if the in-operation system of the duplexed system becomes defective, it is passed to the stand-by system to inherit the past data communication process via the main storage unit of the host computer, without losing the data transferred to and from terminals, and preventing an inoperability of the system for a relatively long period.

What is claimed is:

1. An information communication system comprising:

central processing means including a plurality of CPUs and a plurality of main storage units which are multiplexed;

interface means connected to said central processing means and including a plurality of interface units which are multiplexed, one of said plurality of interface units being in a master state, the other interface units being in a slave state;

communication control means connected to said interface means and including a plurality of communication control units each of which includes a plurality of control modules each of which controls communication lines;

a plurality of terminals connected via said communication lines to said communication control means, wherein one of said plurality of CPUs stores transmission data in at least a specific one of said main storage units, and issues one of a request of point-to-point (PTP) communication and a request of point-to-multipoint (PTMP) communication, wherein said master interface unit reads the transmission data from said specific main storage unit in response to said PTP communication request, and selects and controls one of said plurality of control modules associated with said PTP communication request;

wherein said selected control module transmits the transmission data stored in said specific main storage unit to one of said plurality of terminals associated with said PTP communication request under the control by said master interface unit, wherein said specific master interface unit reads the transmission data from said specific main storage unit in response to said PTMP communication request, and selects and controls ones of said plurality of control modules associated with said PTMP communication request, and wherein said selected Ones Of said plurality of control modules transmit said transmission data stored in said master interface unit to ones of said plurality of terminals associated with said PTMP communication request under the control by said master interface unit.

2. An information communication system according to claim 1, wherein:

each of said associated terminals responds to reception of said transmission data, said selected control modules report reception of the responses from said associated terminals to said master interface unit, and said master interface unit includes means responsive to the reception reports from all said selected control modules, for reporting a completion of said PTMP communication to said one CPU.

3. An information communication system according to claim 1, wherein:

said specific main storage unit includes means for storing communication management information for said PTP communication and said PTMP communication, and said master interface unit includes means for controlling said selected communication control module and said selected ones of said plurality of control modules and reporting one of a communication result and a system status to said one CPU, in accordance with said communication management information.

4. An information communication system according to claim 3, wherein:

said specific main storage unit includes an extended buffer, each of said control modules includes a PTMP communication command queue for registering a PTMP communication command, said master interface unit includes means responsive to said PTMP communication request for registering said PTMP communication commands in said PTMP communication command queues of said selected control modules; and each of said selected control modules further includes means, responsive to the registration of said PTMP communication command over a predetermined number in said PTMP communication command queue thereof, for transferring said transmission data for said PTMP communication command to said specific main storage unit extended buffer.

5. An information communication system according to claim 1, wherein said master interface unit further includes means for storing a plurality of destination patterns each representing ones among communication lines to which the transmission data for said PTMP communication is to be transmitted, said terminals being connected to said communication control means via the communication lines and a network and each control module controlling a plurality of communication lines.

6. An information communication system according to claim 5, wherein said master interface unit further includes means responsive to said PTMP communication request for selecting one of said plurality of stored destination patterns, and for selecting said ones associated with said PTMP communication request from among said plurality of control modules in accordance with said selected destination pattern.

7. An information communication system according to claim 5, wherein:

said one CPU further includes means for issuing a pattern registration command when said PTMP communication request is issued, and said master interface unit further includes means responsive to said pattern registration command, for registering a destination pattern, and for selecting said ones associated with said PTMP communication request from among said plurality of control modules, in accordance with said generated pattern.

8. An information communication system according to claim 3, wherein said communication management information includes PTP communication management information and PTMP communication management information, said PTP communication management information includes queues for registering said PTP communication requests and queues for registering information representing completion of PTP communication, said PTMP communication management information includes a table for registering said PTMP communication request, queues for registering reports of reception completion of said PTMP communication commands from said selected control modules, and a queue for registering information representing the completion of PTMP communication.

9. An information communication system according to claim 3, wherein said communication management information further includes an identification information queue for registering queue identification information for discriminating whether a communication request to be processed by said master interface unit is from said PTP communication request queue or from said PTMP communication request queue.

10. An information communication system according to claim 3, wherein:
said specific main storage unit further includes a reception report queue,
each of said selected control module includes means for registering reception of data transmitted from said terminal in said reception report queue, and
said master interface unit includes means for reporting said one CPU of the reception of said data transmitted from said terminal.

11. An information communication system according to claim 3, wherein:
said communication report information is of a plurality of types,
said specific main storage unit further includes interrupt report queues for reporting interrupts to said one CPU and an interrupt report registered destination queue for indicating that an interrupt was issued for which type of said communication report information,
each of said selected control modules includes means for registering an interrupt indicating an occurrence of abnormality in said interrupt report queue, and
said master interface unit includes means for issuing an interrupt to said one CPU to make said one CPU refer to one of said interrupt report queues.

12. An information communication system according to claim 1, wherein:
said specific main storage unit includes a buffer for storing said transmission data, and
said master interface unit includes:
a buffer;
means for generating a management table for managing said PTMP communication;
means for transferring said transmission data from said specific main storage unit buffer to said master interface unit buffer during said PTMP communication; and
means for selectively instructing said plurality of control modules to transmit said transmission data in accordance with said management table.

13. An information communication system according to claim 12, wherein said master interface unit further includes:

a timer for counting a predetermined time after registering said PTMP communication command to each of said selected control modules; and
means for reporting completion of reception of said PTMP communication request to said one CPU, when command reception completion reports have been received from all said selected control modules before time-out of said timer, and for reporting the completion of reception of said PTMP communication request to said one CPU and notifying said one CPU of said communication lines and said selected control module from which said command reception completion reports were not received, when said command reception completion reports have been received from some of said selected control modules before the time-out of said timer.

14. An information communication system according to claim 1, wherein each of said selective control module includes means for periodically monitoring whether said PTP communication command or said PTMP communication command is issued from said master interface unit.

15. An information communication system according to claim 1, wherein said master interface unit includes means for periodically monitoring whether said PTP communication request or said PTMP communication request is issued from said CPUs.

16. An information communication system according to claim 1, wherein said one CPU includes means responsive to a notice of a failure occurrence at one of said master interface unit, for issuing a system switching command such that said master interface unit is set in the slave state and one of the other slave interface units is set in the master state.

17. An information communication system according to claim 16, wherein:
said specific main storage unit includes a recovery area for storing inheritance information,
said old master interface unit includes means for suspending processes for requests from said CPUs and making said control modules suspend reporting processes responsive to the requests,
said new master interface unit includes means for resuming said suspended processes for the requests in accordance with said inheritance information, and restarting the reporting processes of said control modules.

18. An information communication system according to claim 17, wherein said inheritance information includes a destination pattern table indicating destination terminals in said PTMP communication, a current write pointer table indicating the process status of said PTP and PTMP communication requests, and a next read pointer table indicating request information from said one CPU.

* * * * *